(12) United States Patent
Jurkiewicz et al.

(10) Patent No.: US 10,034,804 B2
(45) Date of Patent: Jul. 31, 2018

(54) ADJUSTABLE SEAT

(71) Applicant: Invacare Corp., Elyira, OH (US)

(72) Inventors: Damon Jurkiewicz, Cleveland, OH (US); Rochelle Mindala, Lakewood, OH (US); Howard Lowenthal, Hinckley, OH (US); Bradley Kushner, Elyria, OH (US)

(73) Assignee: Invacare Corp., Elyria, OH (US)

( * ) Notice: Subject to any disclaimer, the term of this patent is extended or adjusted under 35 U.S.C. 154(b) by 0 days.

(21) Appl. No.: 15/311,586

(22) PCT Filed: May 20, 2015

(86) PCT No.: PCT/US2015/031688
§ 371 (c)(1),
(2) Date: Nov. 16, 2016

(87) PCT Pub. No.: WO2015/179471
PCT Pub. Date: Nov. 26, 2015

(65) Prior Publication Data
US 2017/0079862 A1    Mar. 23, 2017

Related U.S. Application Data

(60) Provisional application No. 62/000,785, filed on May 20, 2014.

(51) Int. Cl.
*A47C 1/024* (2006.01)
*A61G 5/10* (2006.01)
(Continued)

(52) U.S. Cl.
CPC ......... *A61G 5/1067* (2013.01); *A61G 5/1062* (2013.01); *A61G 5/121* (2016.11);
(Continued)

(58) Field of Classification Search
CPC ...... A61G 5/1067; A61G 5/121; A61G 5/122; A61G 2203/74
See application file for complete search history.

(56) References Cited

U.S. PATENT DOCUMENTS

| | | | |
|---|---|---|---|
| 4,655,471 A | 4/1987 | Peek | |
| 4,732,423 A | 3/1988 | Condon | |

(Continued)

FOREIGN PATENT DOCUMENTS

| | | |
|---|---|---|
| EP | 1522298 A2 | 4/2005 |
| WO | 2006/056209 A1 | 6/2006 |
| WO | 2006/116834 A1 | 11/2006 |

OTHER PUBLICATIONS

Search Report from International Application No. PCT/US2015/031688 dated Nov. 25, 2015.

*Primary Examiner* — Rodney B White
(74) *Attorney, Agent, or Firm* — Calfee, Halter & Griswold LLP

(57) ABSTRACT

A seat assembly includes a seat frame, a back frame defining a back plane pivotally connected to the seat frame at a pivot joint, a back support slideably secured to the back frame, and a back support adjusting mechanism. The back support adjusting mechanism includes a first linking member coupling the back support to the seat frame and pivotable about the pivot axis, and a first slide member slideably supported by the back frame and operatively connected to the first linking member. A second slide member is affixed to the back support and slideably supported by the back frame. A second linking member operatively connects the first and second slide members. Pivoting movement of the back frame from the upright position to the reclined position slides the first slide member away from the pivot axis, causing the second linking member to slide the back support toward the pivot axis.

22 Claims, 26 Drawing Sheets

(51) Int. Cl.
  *B60N 2/34* (2006.01)
  *A61G 5/12* (2006.01)
  *B64D 11/06* (2006.01)
  *B60N 2/22* (2006.01)

(52) U.S. Cl.
  CPC .............. *A61G 5/122* (2016.11); *A61G 5/125* (2016.11); *B60N 2/34* (2013.01); *B64D 11/064* (2014.12); *A61G 2203/74* (2013.01); *B60N 2002/2204* (2013.01)

(56) References Cited

U.S. PATENT DOCUMENTS

| | | | |
|---|---|---|---|
| 5,297,021 A | 3/1994 | Koerlin et al. | |
| 5,549,357 A | 8/1996 | Counts | |
| 5,556,157 A | 9/1996 | Wempe | |
| 5,790,997 A * | 8/1998 | Ruehl | A47C 17/162 297/354.13 X |
| 5,823,621 A * | 10/1998 | Broadhead | A61G 5/006 297/354.13 X |
| 5,906,416 A * | 5/1999 | Rasmussen | A47C 7/40 297/284.9 X |
| 5,944,385 A * | 8/1999 | Pearce | A47C 7/40 297/284.9 |
| 6,158,810 A | 12/2000 | Galloway | |
| 6,212,713 B1 * | 4/2001 | Kuck | A47C 20/041 297/354.13 |
| 6,257,664 B1 * | 7/2001 | Chew | A47C 7/405 297/284.9 |
| 6,336,235 B1 * | 1/2002 | Ruehl | A61G 7/00 297/354.13 |
| 6,460,933 B1 * | 10/2002 | Bors | A61G 5/1067 297/284.9 |
| 6,908,154 B2 * | 6/2005 | Aono | A61G 5/006 297/354.13 X |
| 7,040,701 B2 | 5/2006 | Tada | |
| 7,296,856 B2 | 11/2007 | Rozaieski et al. | |
| 7,490,904 B2 | 2/2009 | Hogg | |
| 7,600,817 B2 * | 10/2009 | Kramer | A47C 1/022 297/354.13 |
| 7,658,448 B2 * | 2/2010 | Birk | A47C 1/025 297/452.4 X |
| 8,262,163 B2 * | 9/2012 | Wu | A47C 1/035 297/354.13 X |
| 8,646,795 B2 | 2/2014 | Cerreto | |
| 8,991,933 B2 * | 3/2015 | Johansson | A61G 5/1062 297/284.9 X |
| 9,016,790 B2 * | 4/2015 | Voyce, IV | A47C 1/035 297/354.13 X |
| 2003/0030318 A1 * | 2/2003 | Christofferson | A47C 7/46 297/452.34 |
| 2012/0080919 A1 | 4/2012 | Engman | |

\* cited by examiner

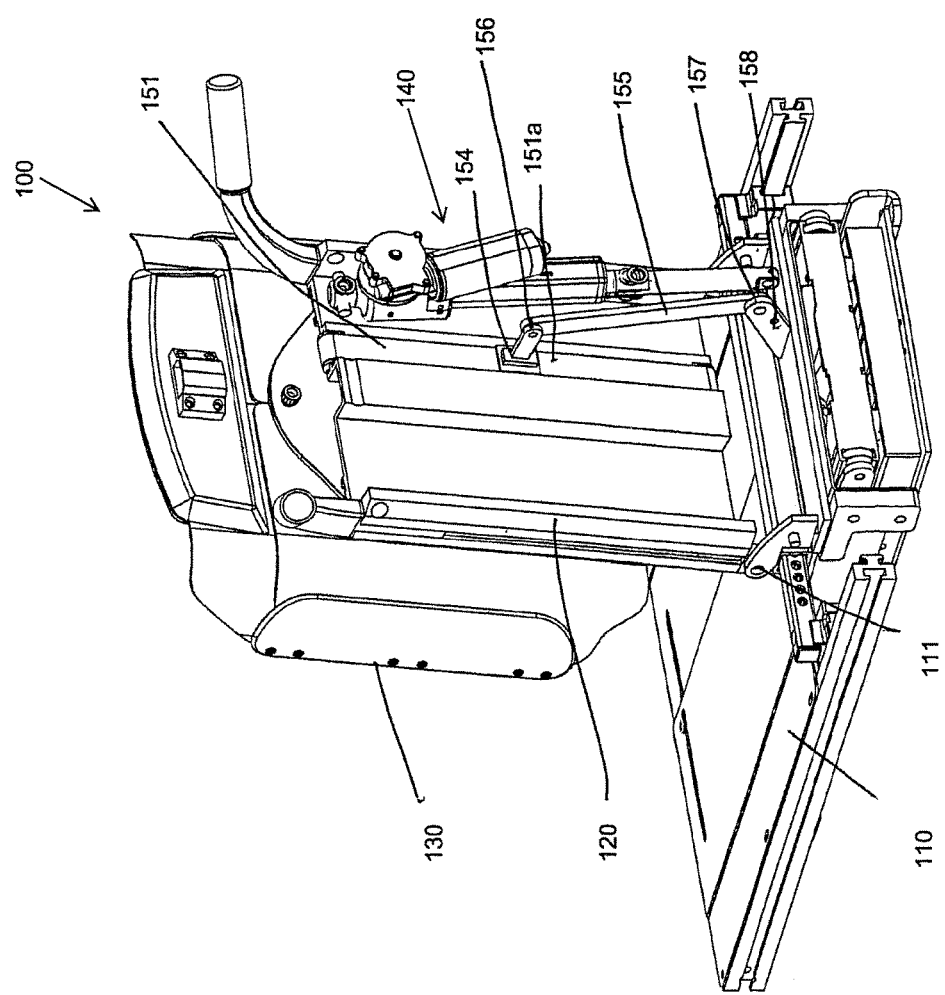

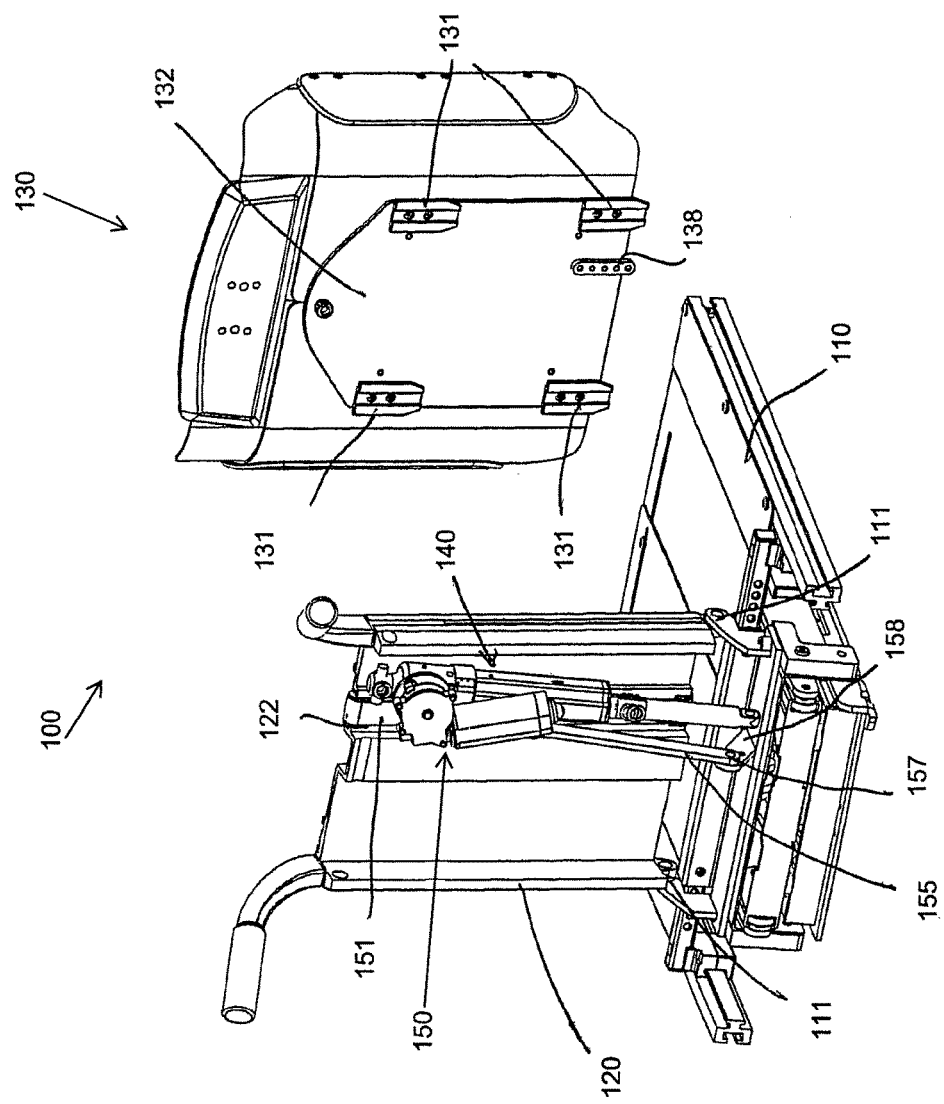

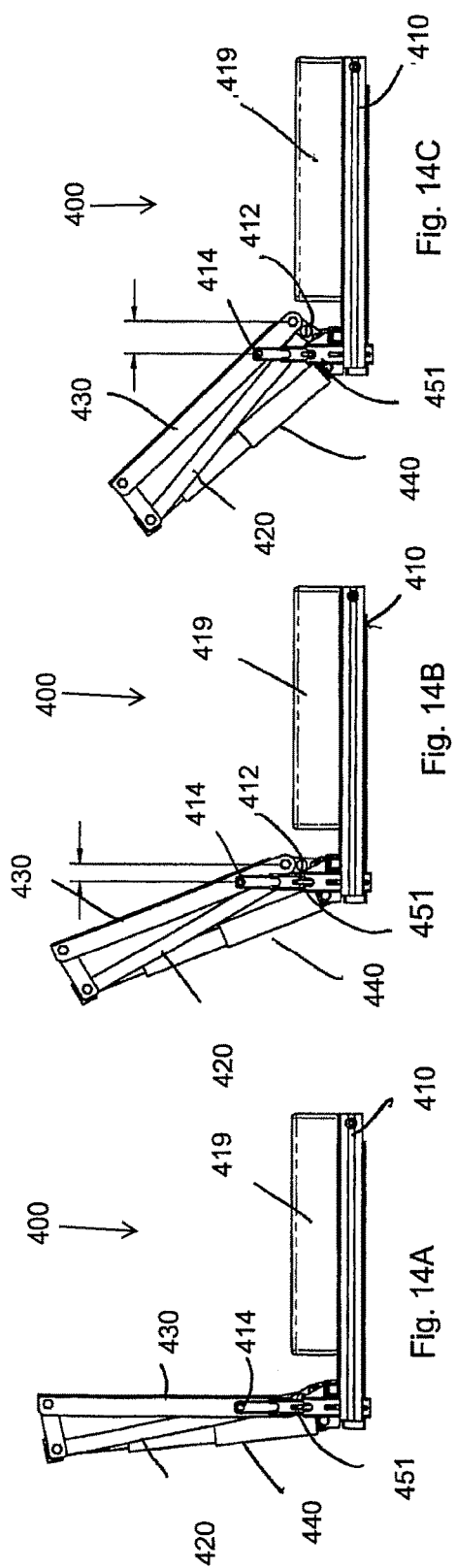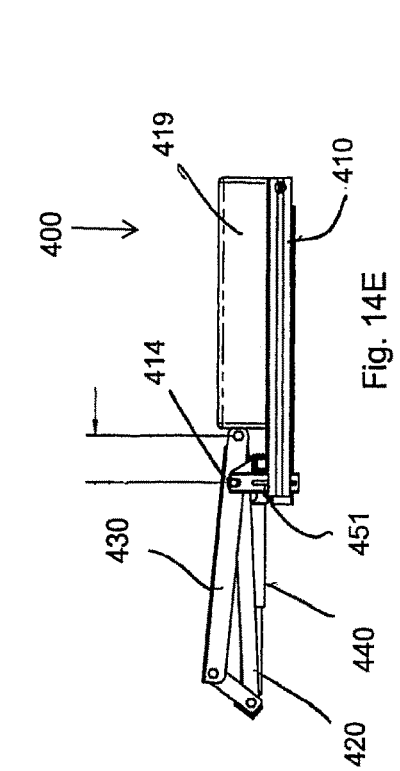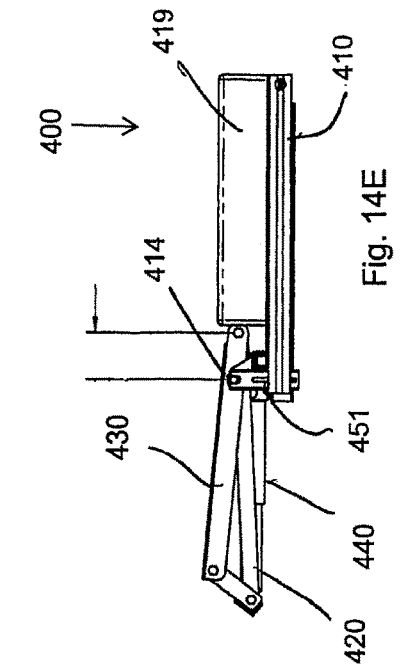

ADJUSTABLE SEAT

CROSS-REFERENCE TO RELATED APPLICATION

This application claims priority to and all benefit of U.S. Provisional Patent Application Ser. No. 62/000,785, filed on May 20, 2014, for ADJUSTABLE SEAT, the entire disclosure of which is fully incorporated herein by reference.

BACKGROUND

Reclining seats generally have a back portion that pivots relative to a bottom portion of the seat about a pivot point. Due to an inherent and generally unavoidable offset between the back portion pivot point and the seat occupant's hip joint, the back portion of a conventional reclining seat moves relative to the user's back as the occupant reclines in the adjusting seat assembly. This movement rubs the user's back as the seat is reclined. This rubbing is generally known as back shear, and can result in discomfort, chafing, or abrasion of the occupant's back. Further, because the back portion moves relative to the user's back, additional seating support items and devices that may be attached to the back portion (e.g., headrests, lateral supports) also shift position relative to the user, resulting in further inconvenience or discomfort.

SUMMARY

In an exemplary embodiment of the present application, a seat assembly includes a seat frame, a back frame defining a back plane pivotally connected to the seat frame at a pivot joint, a back support slideably secured to the back frame, and a back support adjusting mechanism. The back support adjusting mechanism includes a first linking member coupling the back support to the seat frame and pivotable about the pivot axis, and a first slide member slideably supported by the back frame and operatively connected to the first linking member, such that pivoting movement of the back frame from the upright position to the reclined position slides the first slide member away from the pivot axis, and pivoting movement of the back frame from the reclined position to the upright position slides the first slide member towards the pivot axis. A second slide member is affixed to the back support and slideably supported by the back frame. A second linking member operatively connects the first slide member to the second slide member, such that sliding movement of the first slide member away from the pivot axis causes the second linking member to slide the second slide member and the back support toward the pivot axis, and sliding movement of the first slide member towards the pivot axis causes the second linking member to slide the second slide member and the back support away from the pivot axis.

In another exemplary embodiment, a seat assembly for a wheelchair includes a seat frame defining a seating area, a back frame pivotally connected to the seat frame at a pivot joint and pivotable about the pivot joint between a first position and a second position, a back support pivotally connected to the back frame, and at least one slide assembly having a first end affixed to the seat frame and a second end pivotably connected to the back support at a pivot point, the back support being pivotable between upright and reclined positions when the back frame is pivoted between the first and second positions. Movement of the back frame from the first position to the second position causes the second end of the slide assembly to slide toward the first end of the slide assembly, causing the pivot point to move toward the seat frame as the back support pivots from the upright position to the reclined position.

In another exemplary embodiment, a back support includes an anchor plate attachable to a back frame of a wheelchair, a spanner plate securable to the anchor plate in a range of vertical positions to adjust a height of the back support, and first and second wing plates securable to first and second lateral sides of the spanner plate in a range of lateral positions to adjust a width of the back support.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

FIG. 3 is a rear perspective view of the seat assembly of FIG. 1;

FIG. 4 is a rear perspective view of the seat assembly of FIG. 1, shown with the back support detached from the back frame to illustrate additional features of the assembly;

FIG. 14A is a side view of the seat assembly of FIG. 12, shown in a fully upright (approximately 90 degree) position;

FIG. 14B is a side view of the seat assembly of FIG. 12, shown in a partially reclined (approximately 113 degree) position;

FIG. 14C is a side view of the seat assembly of FIG. 12, shown in a partially reclined (approximately 135 degree) position;

FIG. 14D is a side view of the seat assembly of FIG. 12, shown in a partially reclined (approximately 158 degree) position;

FIG. 14E is a side view of the seat assembly of FIG. 12, shown in a fully reclined (approximately 175 degree) position;

DESCRIPTION OF EMBODIMENTS

As described herein, when one or more components are described as being connected, joined, affixed, coupled, attached, or otherwise interconnected, such interconnection may be direct as between the components or may be in direct such as through the use of one or more intermediary components. Also as described herein, reference to a "member," "component," or "portion" shall not be limited to a single structural member, component, or element but can include an assembly of components, members or elements.

A reclining seat is disclosed in the present application. In many exemplary embodiments disclosed herein, the reclining seat is utilized on a wheelchair having a tiltable seat assembly. However, the reclining seat may be utilized on any conventional or typical wheelchair such as a powered wheelchair or manual wheelchair. The reclining seat may also be utilized in a variety of other devices and apparatuses.

Figure 1:
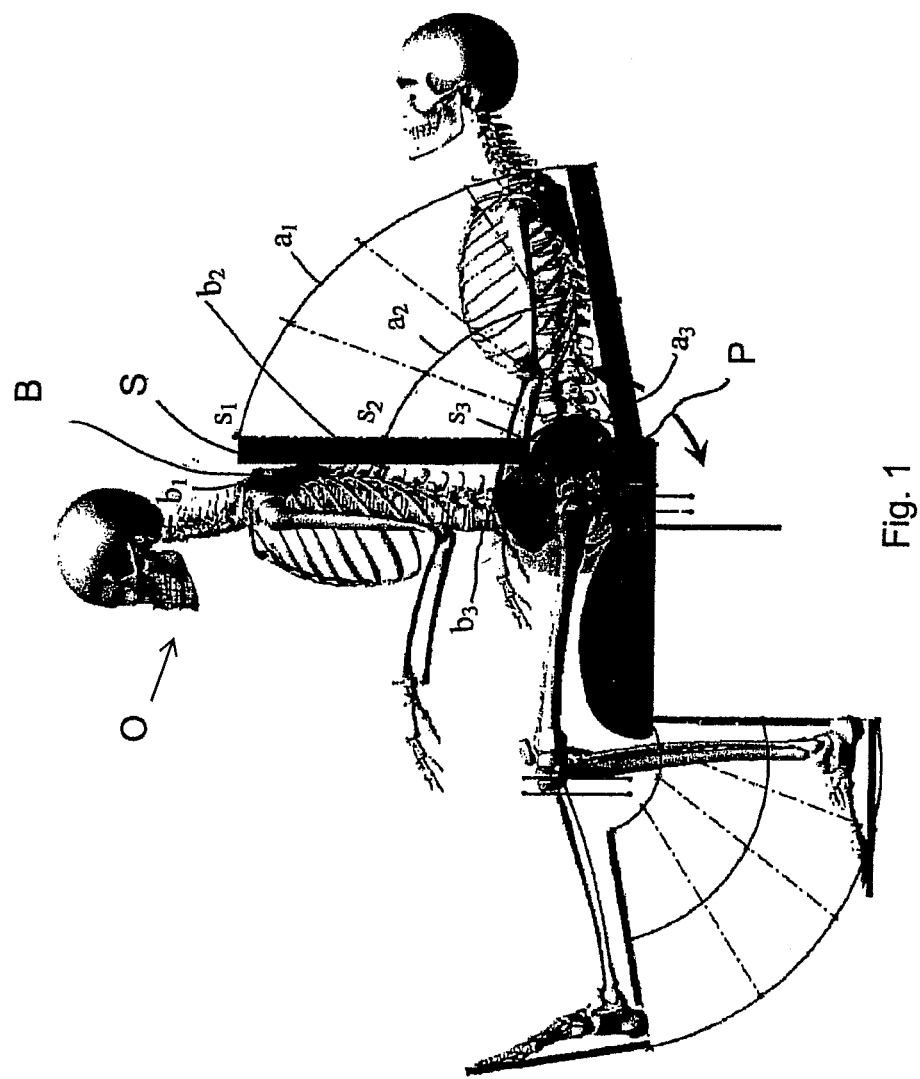
FIG. 1 is a side schematic view of a reclining seat assembly with a back support configured to move radially with respect to a pivot point during a seat back reclining operation.
Figure 2:
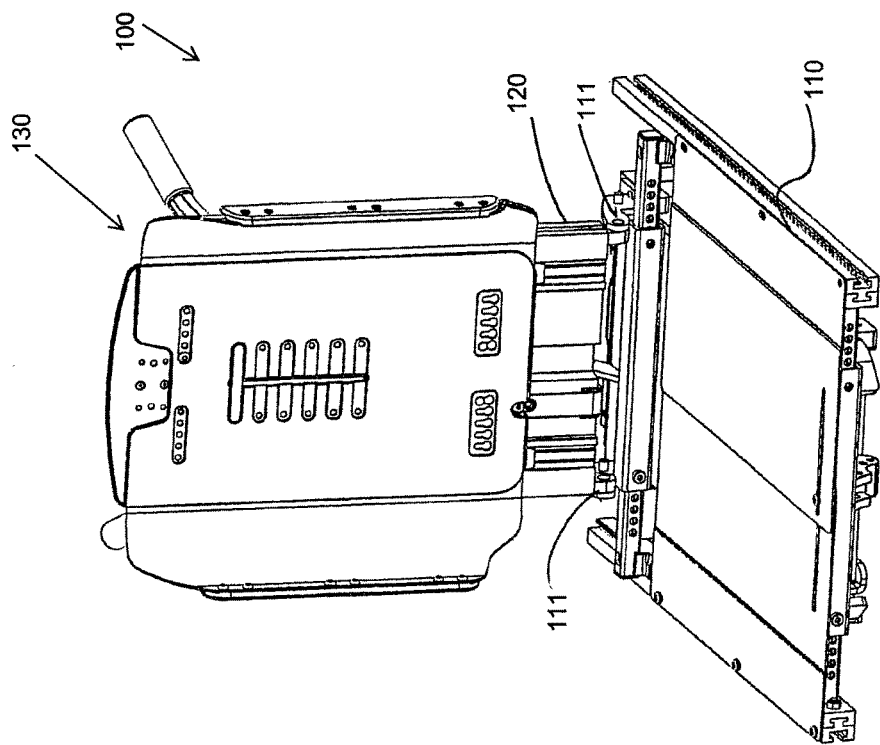
FIG. 2 is a front perspective view of a seat assembly in accordance with an exemplary embodiment.
Figure 2A:
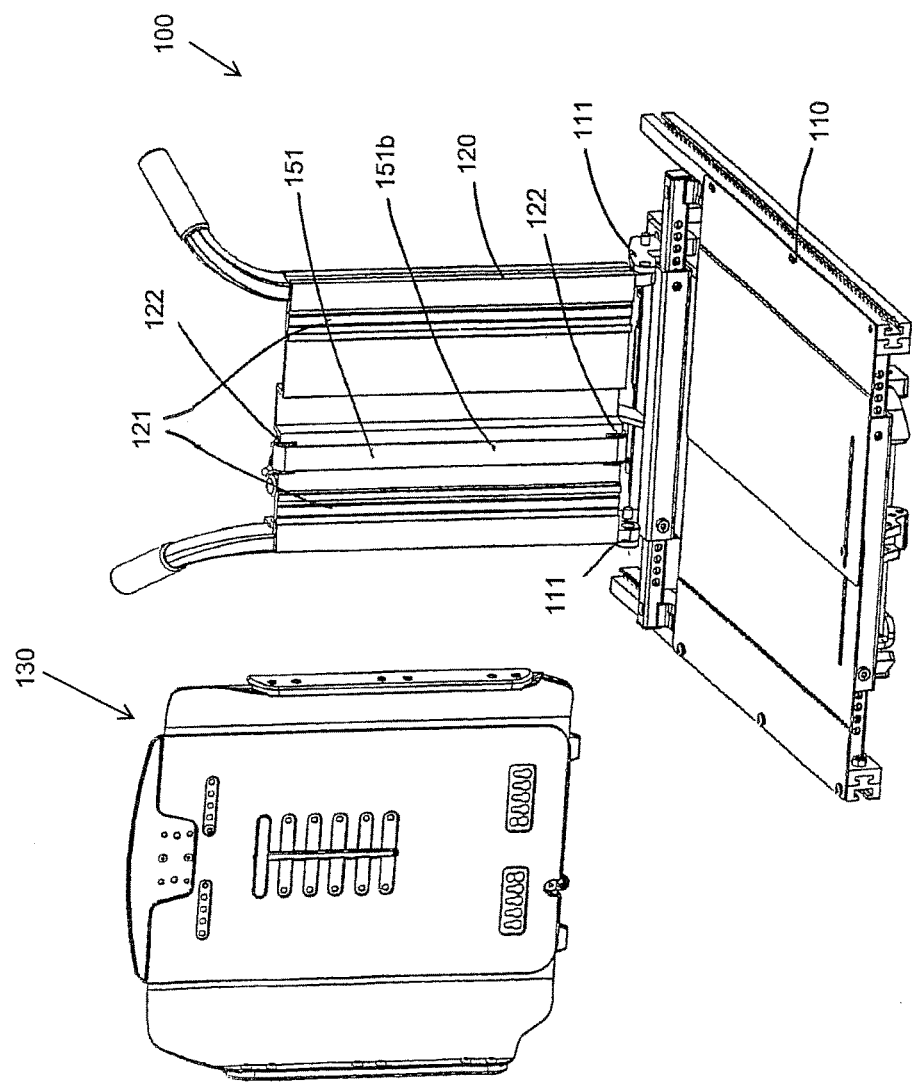
FIG. 2A is a front perspective view of the seat assembly of FIG. 1, shown with the back support detached from the back frame to illustrate additional features of the assembly.

To reduce or eliminate the back shear resulting from an offset between the pivot point of a reclining seat back and the pivoting hip joint of the seat occupant, the present application contemplates the use of a seat back adjustment mechanism configured to radially move a back support portion of the seat back with respect to the pivot point as the seat back is pivoted between upright and reclined positions. As schematically shown in FIG. 1, to best approximate the path of travel of the seat occupant's back B between the upright and reclined positions, the seat back adjustment mechanism may be configured to position discrete locations s1, s2, s3 on the back support S along motion arcs a1, a2, a3 that track the actual positions of the occupant's back locations b1, b2, b3, between the upright and reclined positions. As evident in FIG. 1, the position of the occupant's back B moves closer to the conventional seat back pivot point P as the occupant O reclines from the upright position to the reclined position. This movement of the back B with respect to the pivot point P is generally nonlinear, with the greatest amount of radial movement of the back occurring during the first half (e.g., 90 degrees to 135 degrees) of reclining movement between the upright and fully reclined or prone positions. As such, the seat back adjustment mechanism may be configured to be similarly nonlinear, to best approximate the locations of the back B along the entire range of motion of the reclining seat.

Many different mechanisms may be utilized to adjust the position of the reclining seat back support to approximate this radial movement of the back. In one embodiment, an electronically operated reclining wheelchair seat may be programmed to instruct back support positioning components (e.g., servomotors, solenoids, or other actuators), to position the back support at predetermined radial positions that correspond to predicted radial positions of an occupant's back at the corresponding angle of inclination of the seat back. In exemplary embodiments, such a system may be adaptable to account for specific dimensions (e.g., height, torso length) of the occupant, to best approximate the true position of the occupant's back along the entire range of travel of the reclining seat back.

In accordance with an aspect of the present application, in other embodiments, a mechanical linkage may be provided between the back support, the seat frame, and a reclining back frame to adjust the position of the back support as the back frame pivots with respect to the seat frame. The linkage may utilize one or more sliding and/or pivoting elements configured such that the pivoting movement of the reclining (or inclining) back frame drives radial movement of the back support substantially along predetermined positional motion arcs of a chair occupant (e.g., the arcs a1, a2, a3 of FIG. 1). Such an arrangement may eliminate the need for complex electronic back support positioning systems (and their associated costs), while still providing for shear reducing adjustment of the back support during a reclining operation.

Many different configurations may be utilized to provide for automatic adjustment of a seat back portion during a reclining operation of the seat assembly. One such exemplary arrangement is described in co-owned U.S. Pat. No. 8,646,795 to Cerreto (the "'795 Patent"), the entire disclosure of which is incorporated by reference. In the '795 Patent, the seat back portion is connected to the seat bottom portion by an adjustable four-bar linkage assembly, which provides for downward and forward movement of the seat back portion relative to the bottom portion as the seat back and linkage move from an upright position to a reclined position.

In accordance with an aspect of the present application, a reclining seat assembly may be provided with a back frame that is pivotable about a pivot joint (e.g., a fixed pivot point) and a back support that is secured to the back frame. The back support is slideable with respect to the back frame along a back plane from a first position distal to the pivot joint and a second position proximate to the pivot joint when the back frame is pivoted from an upright position to a reclined position. This sliding movement of the back support may be configured to approximate movement of the chair occupant's back with respect to the pivot joint as the occupied seat is reclined.

Many different back support adjusting mechanisms may be utilized to control sliding movement of the back support with respect to the back frame as the back frame is pivoted with respect to the seat frame. In one embodiment, a linkage arrangement couples the back support to the seat frame. The linkage arrangement is configured such that movement of the back frame from the upright position to the reclined position causes the linkage arrangement to slide the back support from a first position distal to the pivot joint to a second position proximate to the pivot joint.

In one embodiment, a first portion of the back support adjusting mechanism is assembled with the seat frame and a second portion of the back support adjusting mechanism is assembled with the back frame, such that pivoting movement of the back frame with respect to the seat frame drives movement of the linkage arrangement to generate sliding movement of the back support. In one such embodiment, a first portion of the back support adjusting mechanism includes a first linking member having a first portion connected to the seat frame and a second portion connected to a first slide member slideably supported by the back frame. A second portion of the back support adjusting mechanism includes a second linking member having a first portion connected to the first slide member and a second portion connected to a second slide member slideably supported by the back frame and affixed to the back support. When the back frame is pivoted between the upright position and the reclined position (e.g., by a motor driven actuator), the first linking member imparts sliding movement on the first slide member, which in turn imparts sliding movement on the second slide member and back support to slide the back support along the length of the back frame.

Many different types of linking members may be utilized to provide for sliding movement of the back support with respect to the back frame. In one embodiment, a belt (e.g., a strap, cable, chain, etc.) is assembled with the back frame, with a first portion of the belt, disposed on a rear side of the back frame, secured to a first slide member at a second end of a first linking member connected with the seat frame, and a second portion of the belt, disposed on a front side of the back frame, affixed to the second slide member and back support. When the back frame is pivoted in a reclining direction, the first linking member imparts an upward sliding force on the first slide member and the rear portion of the belt, sliding the front portion of the belt downward. The downward movement of the front portion of the belt causes the back support to slide downward or toward a position proximate to the pivot joint, to approximate the shifting position of the chair occupant's back with respect to a back plane defined by the back frame. When the back frame is pivoted toward the upright position, the first linking member imparts a downward sliding force on the first slide member and the rear portion of the belt, sliding the front portion of the belt upward. The upward movement of the front portion of the belt causes the back support to slide upward or toward a position distal to the pivot joint, to approximate the shifting position of the chair occupant's back with respect to the back plane.

FIGS. 2-5E illustrate an exemplary embodiment of a wheelchair seat assembly 100 including a seat frame 110, a back frame 120 pivotally connected to the seat frame (at pivot joint 111), a back support 130 slideably assembled with the seat frame, and a back support adjusting mechanism 150 for controlling the position of the back support on the back frame as the back frame is pivoted with respect to the seat frame. While many different mechanical or electromechanical mechanisms may be used to impart pivoting movement on the back frame 120, in the illustrated embodiment, a motor-driven piston rod assembly 140 is assembled with the seat frame 110 and back frame 120 to pivot the back frame with respect to the seat frame, for example, in response to manipulation of a switch, button or other such instrument on the wheelchair (not shown).

The exemplary back support 130 includes flanged slider brackets 131 secured to a rear surface 132 of the back support 130 (FIG. 4). The slider brackets 131 are slideably received in recessed tracks 121 in a front surface of the back frame 120, to guide sliding movement of the back support 130 along the back frame 120.

The back support adjusting mechanism 150 includes a belt 151 extending around the back frame 120, with a first portion 151a of the belt disposed on a rear surface of the back frame and a second portion 151b of the belt disposed on a front surface of the back frame. The exemplary belt 151 extends around pulleys 122 assembled with the back frame 120, to facilitate sliding movement of the belt 151 around the back frame 120.

The first portion 151a of the belt 151 is pivotally connected to a second end 156 of a first linking member 155 by a first slide member or plate 154 affixed to the belt or second linking member 151 (e.g., using fasteners, adhesive, or other suitable connections). The first end 157 of the linking member 155 is pivotally connected to the seat frame 110 by plate 158. The second portion 151b of the belt 151 is affixed to the rear surface 132 of the back support, for example, using a clip 138, as shown in FIG. 4, or any other suitable fasteners, adhesive, or other such connections.

Figure 5A:
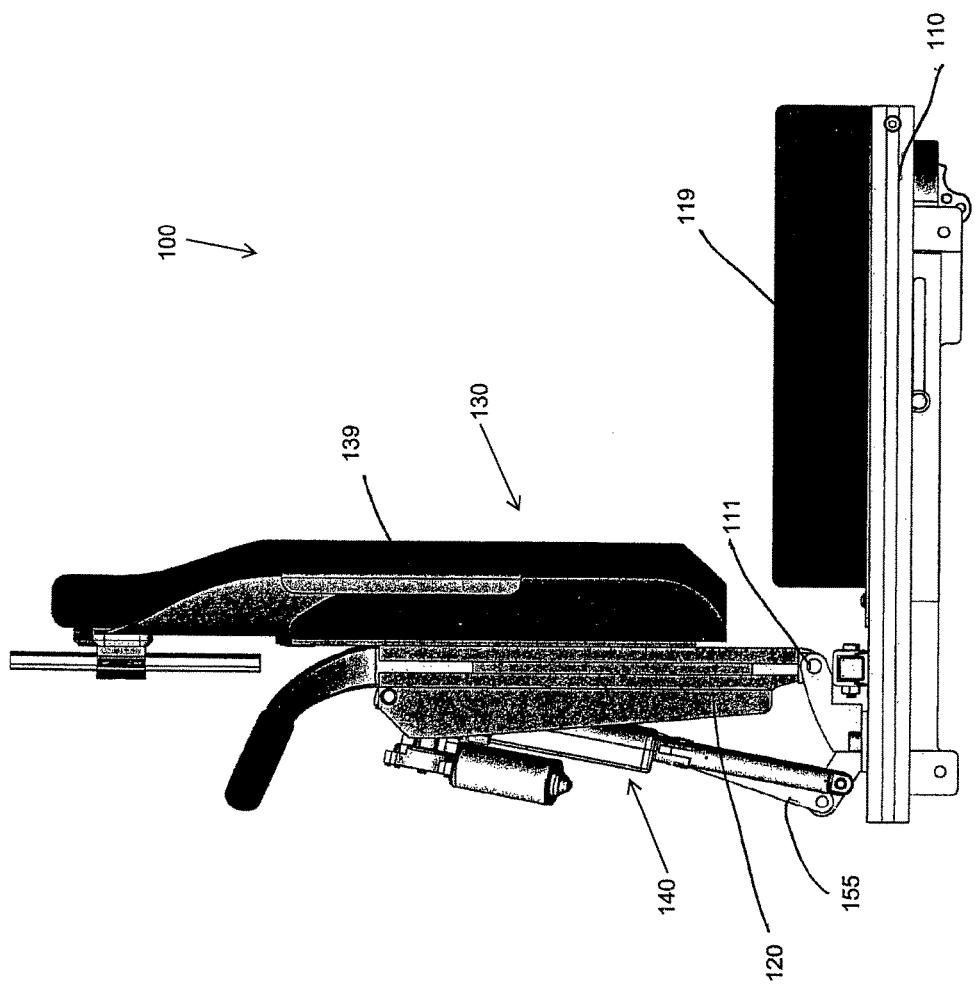
FIG. 5A is a side view of the seat assembly of FIG. 1, shown in a fully upright (approximately 90 degree) position.
Figure 5B:
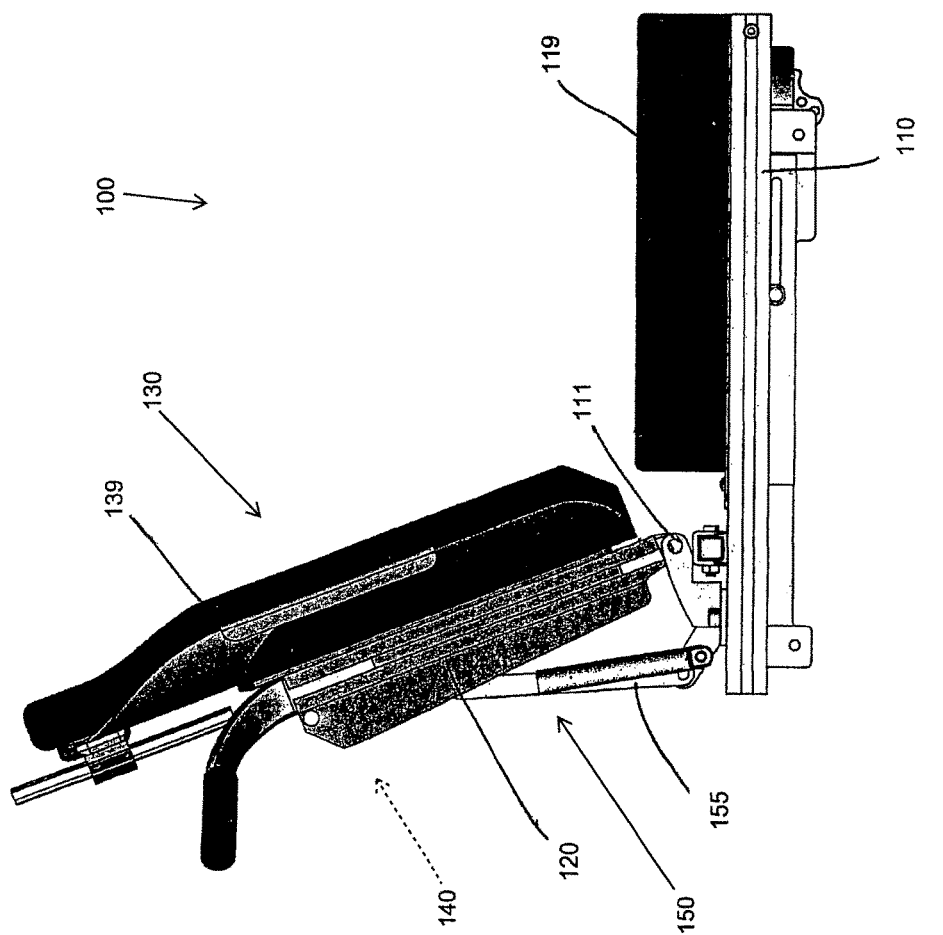
FIG. 5B is a side view of the seat assembly of FIG. 1, shown in a partially reclined (approximately 113 degree) position.
Figure 5C:
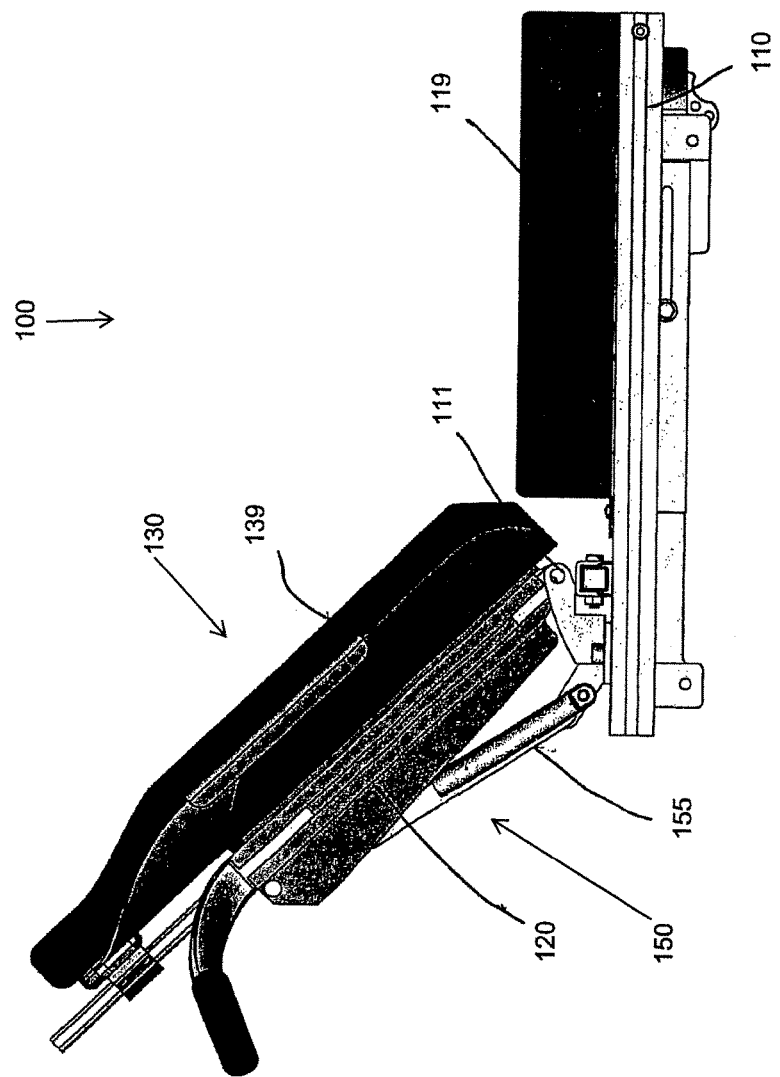
FIG. 5C is a side view of the seat assembly of FIG. 1, shown in a partially reclined (approximately 135 degree) position.
Figure 5D:
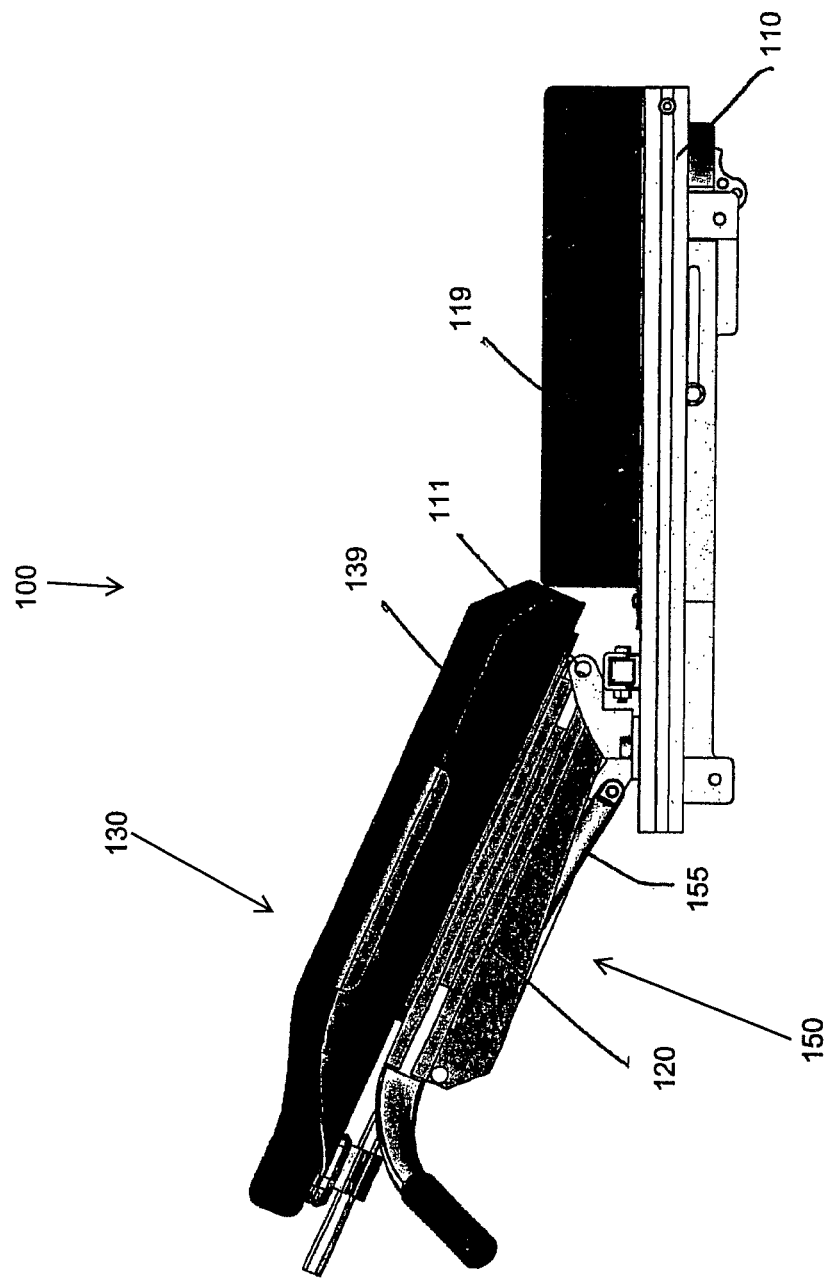
FIG. 5D is a side view of the seat assembly of FIG. 1, shown in a partially reclined (approximately 158 degree) position.
Figure 5E:
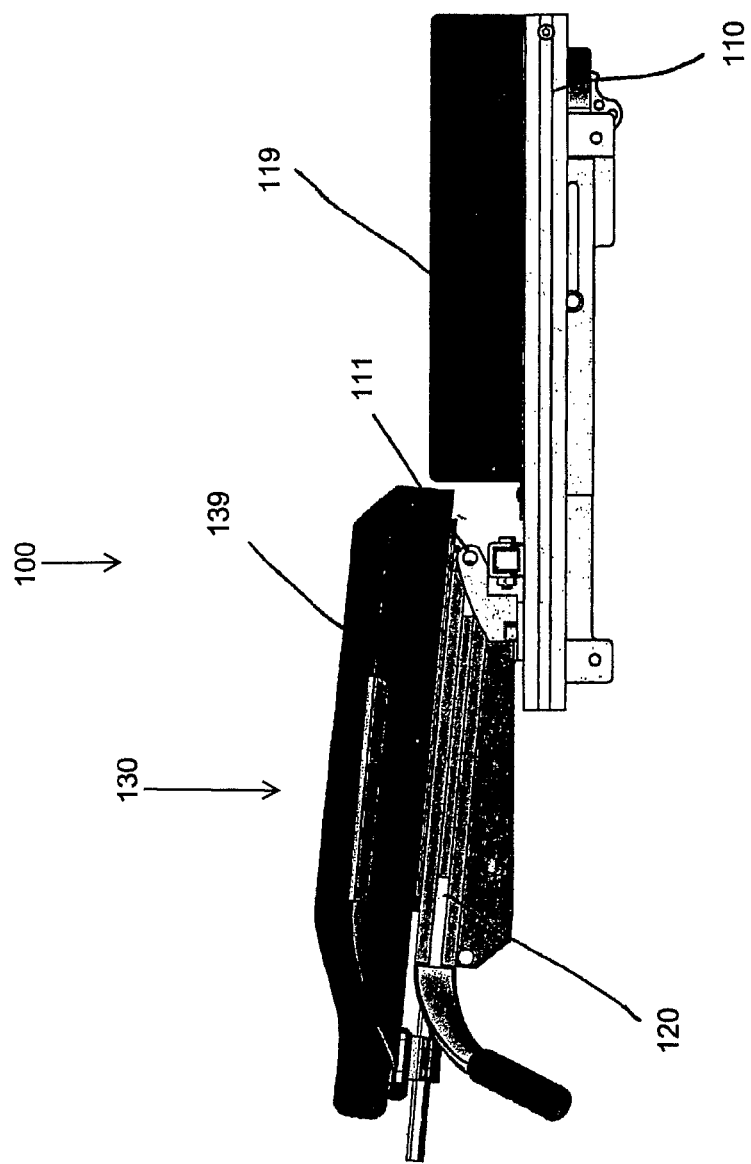
FIG. 5E is a side view of the seat assembly of FIG. 1, shown in a fully reclined (approximately 175 degree) position.

As shown in FIGS. 5A-5E, to move the seat assembly 100 to a reclined position, the motor assembly 140 is actuated to pull the back frame 120 rearward, pivoting the back frame 120 about the pivot joints 111 in a reclining direction. The linking member 155 pivots rearward about the first end 157, causing the second end 156 to slide the first portion 151a of the belt 151 upward. The resulting downward movement of the second portion 151b of the belt causes the attached back support 130 to slide downward or toward a position proximate to the pivot joints 111, to approximate the shifting position of the chair occupant's back with respect to a back plane defined by the back frame. As shown in FIG. 5E, the fully reclined back support may be substantially flat or nearly flat (e.g., approximately 175 degrees), with a seat support surface (defined by a seat cushion 119 secured to the seat frame 110) and a back support surface (defined by a back cushion 139 secured to the back support 130) being substantially or nearly aligned, for example, to maximize comfort of a fully reclined or prone occupant.

To move the seat assembly to an upright position, the motor assembly 140 is actuated to push the back frame 120 forward, pivoting the back frame 120 about the pivot joints 111 in an inclining direction. The linking member 155 pivots forward about the first end 157, causing the second end 156 to slide the first portion 151a of the belt 151 downward. The resulting upward movement of the second portion 151b of the belt causes the attached back support 130 to slide upward or toward a position distal to the pivot joints 111, to approximate the shifting position of the chair occupant's back with respect to the back plane.

FIGS. 6-8B illustrate another exemplary seat assembly 200 similar to the seat assembly 100 of FIGS. 2-5E. The linkage assembly 250 includes a cable belt 251 extending around the back frame 220, with a first portion 251a of the belt disposed on a rear surface of the back frame and a second portion 251b of the belt disposed on a front surface of the back frame. The exemplary belt 251 extends around pulleys 222 assembled with the back frame 220, to facilitate sliding movement of the belt 251 around the back frame 220.

The second portion 251b of the belt 251 is affixed to the rear surface 232 of the back support 230. While many different types of connections may be utilized (for example, fasteners or clips), in the illustrated embodiment (see FIG. 6A), a detachable cable retention bracket 260 is utilized to facilitate removal, replacement, and reassembly of a back support 230 with the back frame 220 and cable belt 251. The bracket 260 is disposed on the front surface of the back frame 220, and a clamping plate 262 is fastened to the bracket 260 to clamp the front portion 251a of the cable 251 therebetween, such that the bracket 260 slides with the cable 251 during operation of the seat reclining mechanism. Spring loaded retaining pins 264 extend from the sides of the bracket 260 and are received in corresponding notch plates 234 on the rear surface of the back support 230 to secure the back support to the front portion 251a of the cable 251. When the seat assembly 200 is in the upright position, release tabs 265 extend below a lower end of the back support 230 for manipulation by the user. When the release tabs 265 are squeezed towards each other, the spring loaded retaining pins 264 are retracted from the notch plates 234, releasing the back support from the cable retention bracket 260. The back support 230 is then permitted to slide off of the back frame 220, for example, for repair or replacement of the back support. Bottom portions of the notch plates 234 are chamfered, such that when the back support is slid back onto the back frame, the retaining pins 264 are retracted by the chamfered surfaces and then spring back into interlocking engagement with the notch plates 234.

The first portion 251a of the cable 251 is pivotally connected to a second end 256 of a first linking member 255 by a mounting plate 254 affixed to the cable or second linking member 251. While many different types of connections may be utilized (for example, fasteners or clips), in the illustrated embodiment, the rear portion 251b of the cable 251 includes an enlarged first end 252 anchored in a notch 254a in the mounting plate 254, and a threaded second end 253 assembled with a hole 254b in the mounting plate to allow for tightening or loosening of the cable 251. The first end 257 of the linking member 255 is pivotally connected to the seat frame 210 by plate 258.

As shown in the exemplary embodiment of FIGS. 6-8B, other features may additionally or alternatively be provided to enable further adjustability of a seat assembly. For example, a reclining seat assembly may be configured to provide for automatic adjustment of an armrest assembly as the back frame reclines with respect to the seat, for example, to maintain a substantially horizontal (with respect to the seat frame) position of the armrest.

In the exemplary embodiment of FIGS. 6-8B, armrest assemblies 270 (only shown on one side, but may be assembled to both sides of the seat assembly) include an arm support member 271, and first and second link members 272, 273. The first link member 272 is pivotally connected to the seat frame 210 at a first end 272a, and is pivotally connected to a first end 273a of the second link member 273 at a second end 272b. The second link member 273 is slideably assembled with a side rail portion 224 of the back frame 220, and includes a second end 273b connected to the arm support member 271. When the back frame is pivoted from the upright position (FIG. 8A) to the reclined position (FIG. 8B), the first link member 272 pivots rearward about its first end 272a, and the second link member 273 pivots forward about its first end 273a, causing the angle of the arm support member 271 with respect to the back frame 220 to adjust to maintain a horizontal position with respect to the seat frame 210. The second link member 273 is permitted to slide along the back frame side rail to facilitate adjustment.

According to another aspect of the present application, the seat frame and back support may be provided with adjustable plates to adjust the size of seat and back support areas defined by the seat assembly. In the exemplary embodiment of FIGS. 6-8B, as shown in greater detail in FIGS. 15-18, an exemplary expandable back system 500 includes a central anchor plate 510, left and right lower wing plates 520, 530, left and right upper wing plates 540, 550, and a front spanning plate or panel 560. The anchor plate 510 fastens to the back frame (by flanged slider brackets 231) and to the cable belt 251 (by notch plates 234), as described in greater detail above. The left and right lower wing plates 520, 530 are fastened to the anchor plate 510 by countersunk screws assembled through portions of scalloped slots 521, 531 aligned with corresponding fastener holes 511a, 511b in the anchor plate. The upper wing plates 540, 550 follow the width set by the lower wing plates 520, 530 and are held together with the upper wing plates by upper wing edges 545, 555, which allow for vertical adjustment of the upper wing plates to set the height of the back system 500. Fixed buttons 543, 553 in the front surfaces of the upper wing plates 540, 550 are received in selected corresponding keyed holes 563a, 563b in the spanning panel 560 to rigidly fix the upper wing plates 540, 550 and spanning panel 560 to each other. The upper wing plates and spanning plate are secured in a selected vertical position with respect to the lower wing plates 520, 530 and anchor plate 510 by a user adjustable fastener 515 installed through the anchor plate 510 and assembled with a threaded rear portion 566 of a vertical adjustment bar 565 assembled with a selected hole 567 in the spanning plate 560. Rear nubs 568a, 568b on either end of the vertical adjustment bar 565 engage aligned holes 569a, 569b in the spanning plate 560 to further secure the vertical adjustment mechanism. A headrest plate or panel 570 is secured to a rear surface of the spanning panel 560 for attachment of a headrest.

Figure 6:
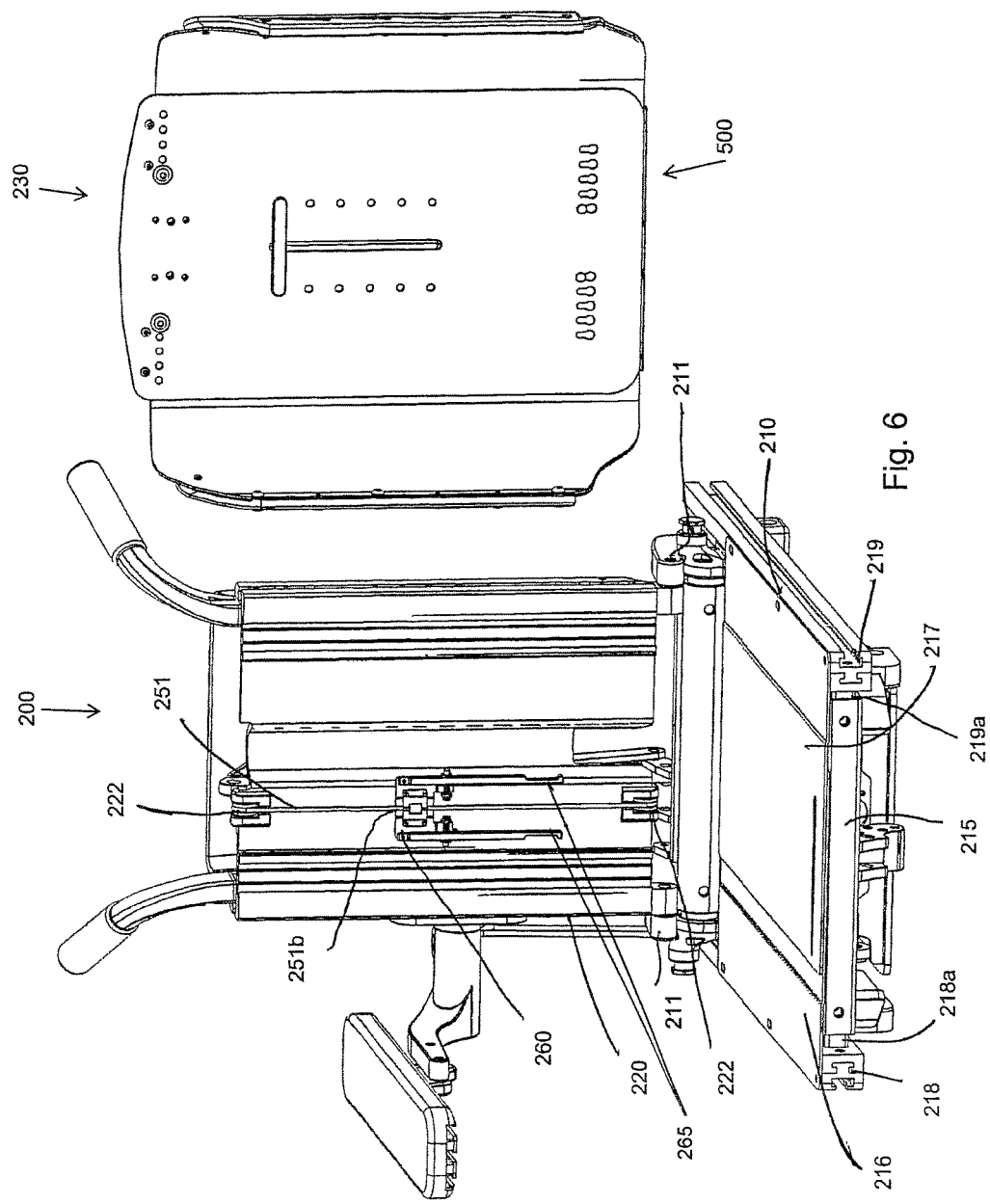
FIG. 6 is a front perspective view of a seat assembly in accordance with another exemplary embodiment, shown with the back support detached from the back frame to illustrate additional features of the assembly.
Figure 6A:
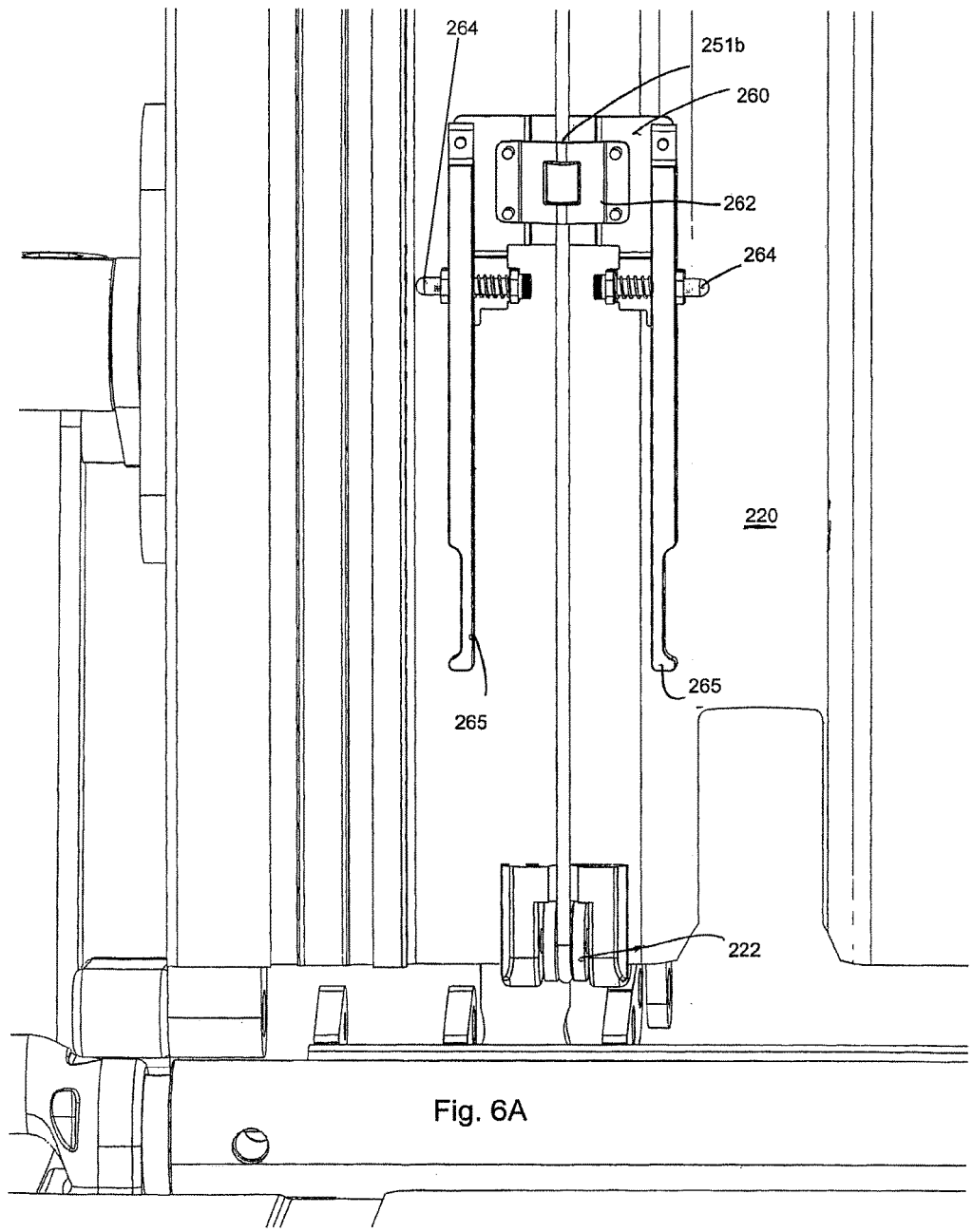
FIG. 6A is an enlarged partial front view of the back frame of the seat assembly of FIG. 6.
Figure 7:
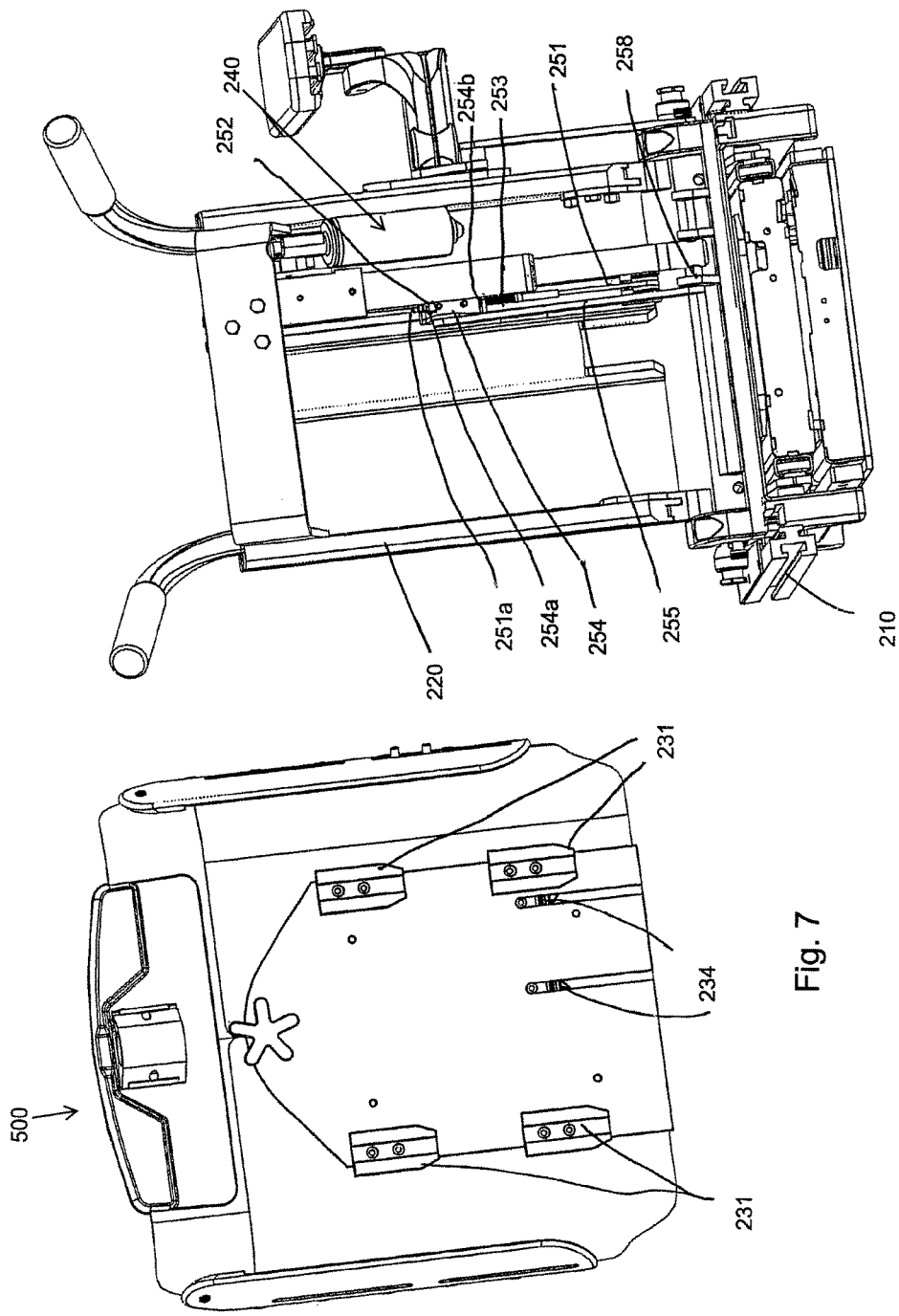
FIG. 7 is a rear perspective view of the seat assembly of FIG. 6, shown with the back support detached from the back frame to illustrate additional features of the assembly.
Figure 7A:
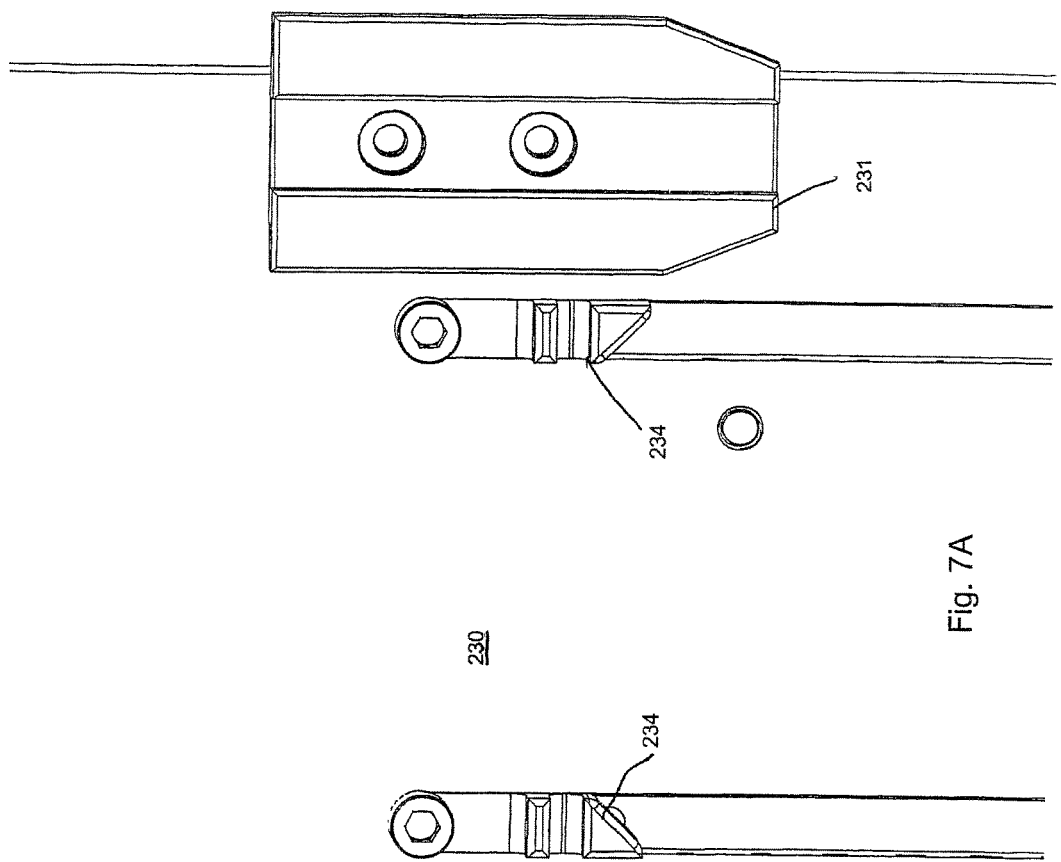
FIG. 7A is an enlarged partial rear view of the back support of the seat assembly of FIG. 6.
Figure 8A:
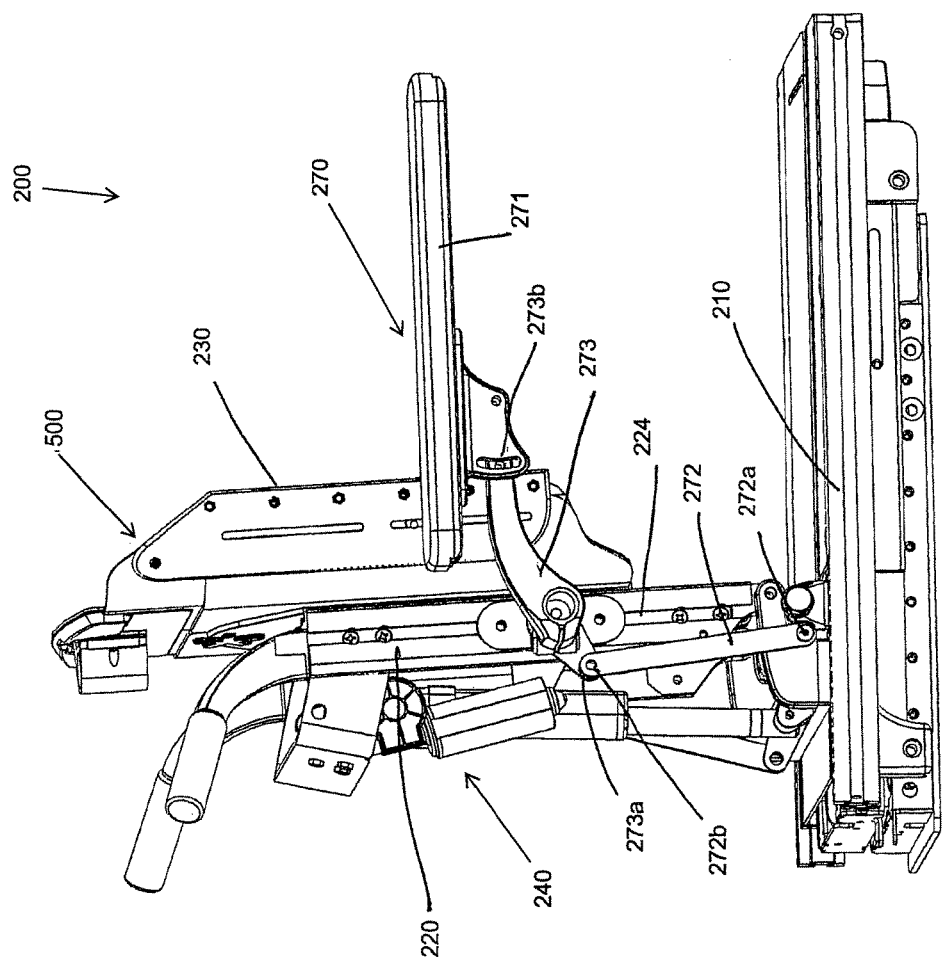
FIG. 8A is a side view of the seat assembly of FIG. 6, shown in an upright position.
Figure 8B:
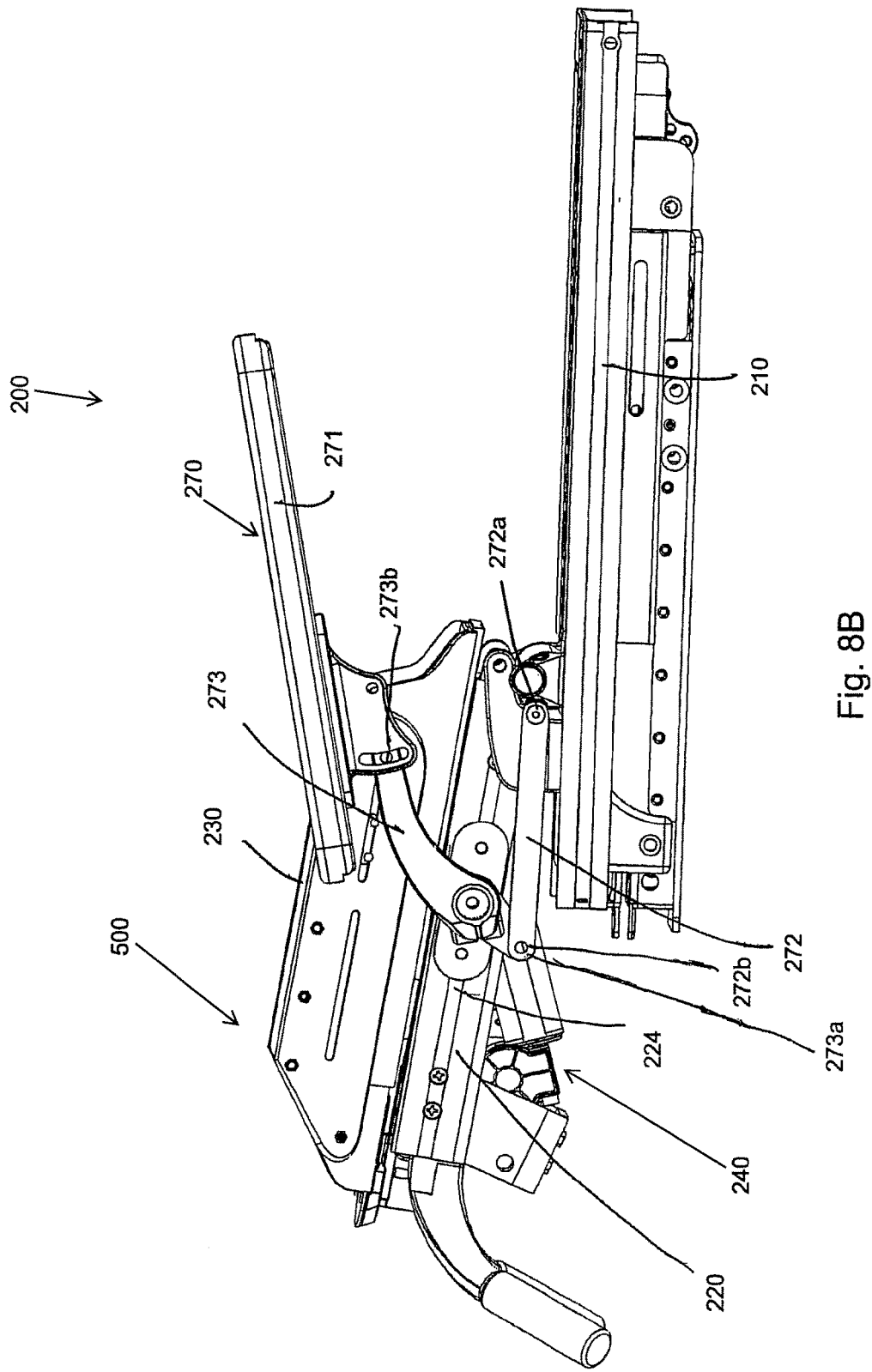
FIG. 8B is a side view of the seat assembly of FIG. 6, shown in a reclined position.

As shown in FIG. 6, the exemplary seat frame 210 includes overlapping left and right seat support plates 216, 217 slideable to define a width of a seating surface on the seat frame. The seat support plates 216, 217 are fastened to corresponding left and right seat rails 218, 219, adapted for attachment to a wheelchair base (not shown). Bar extensions 218a, 219a affixed to the seat rails 218, 219 extend into a front cross member 215 on the seat frame to provide for secure adjustment of the seat width (e.g., by fasteners installed through aligned holes in the front cross member 215 and bar extensions 218a, 219a).

In another embodiment, a shear reducing linkage assembly for a reclining seat may include a slide plate connected to a back support and slideable on a back frame to accommodate sliding movement of the back support on the back frame as the back frame is pivoted with respect to the seat frame, to approximate movement of the chair occupant's back with respect to the pivot joint as the occupied seat is reclined.

Figure 9:
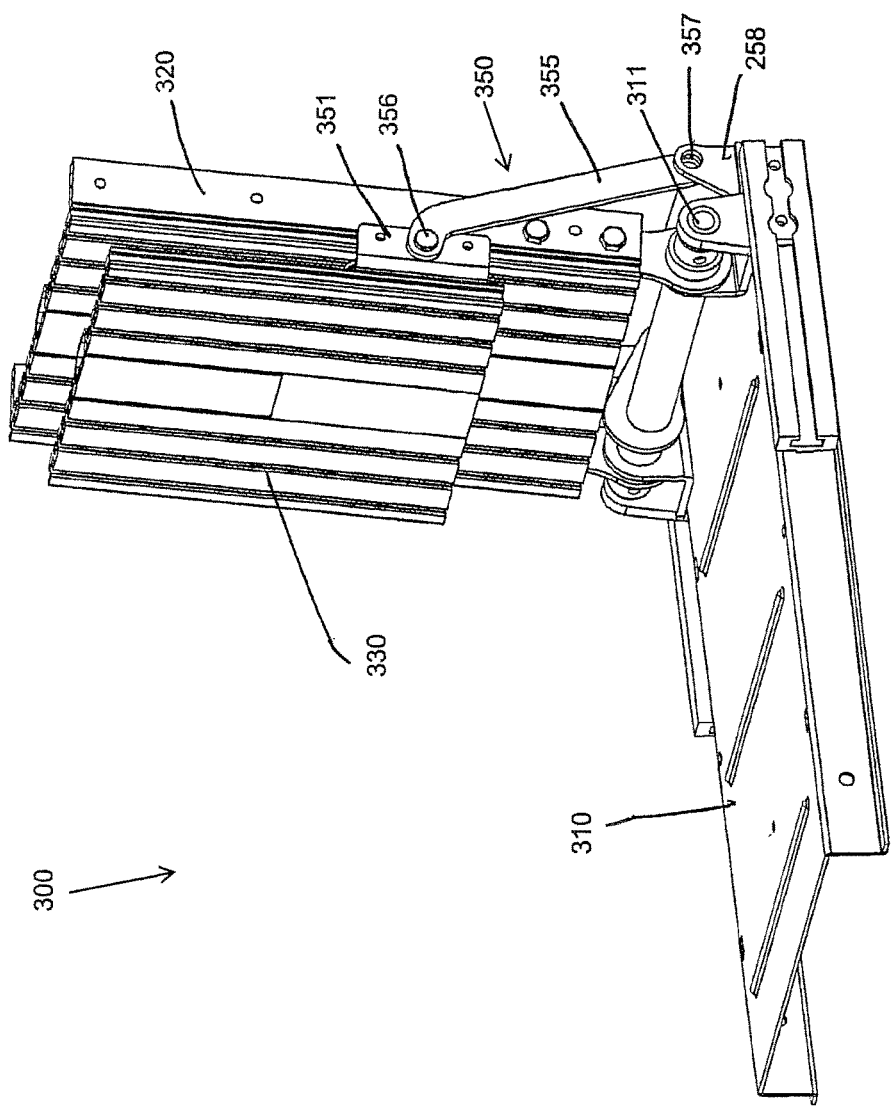
FIG. 9 is a side perspective view of a seat assembly in accordance with another exemplary embodiment.
Figure 10:
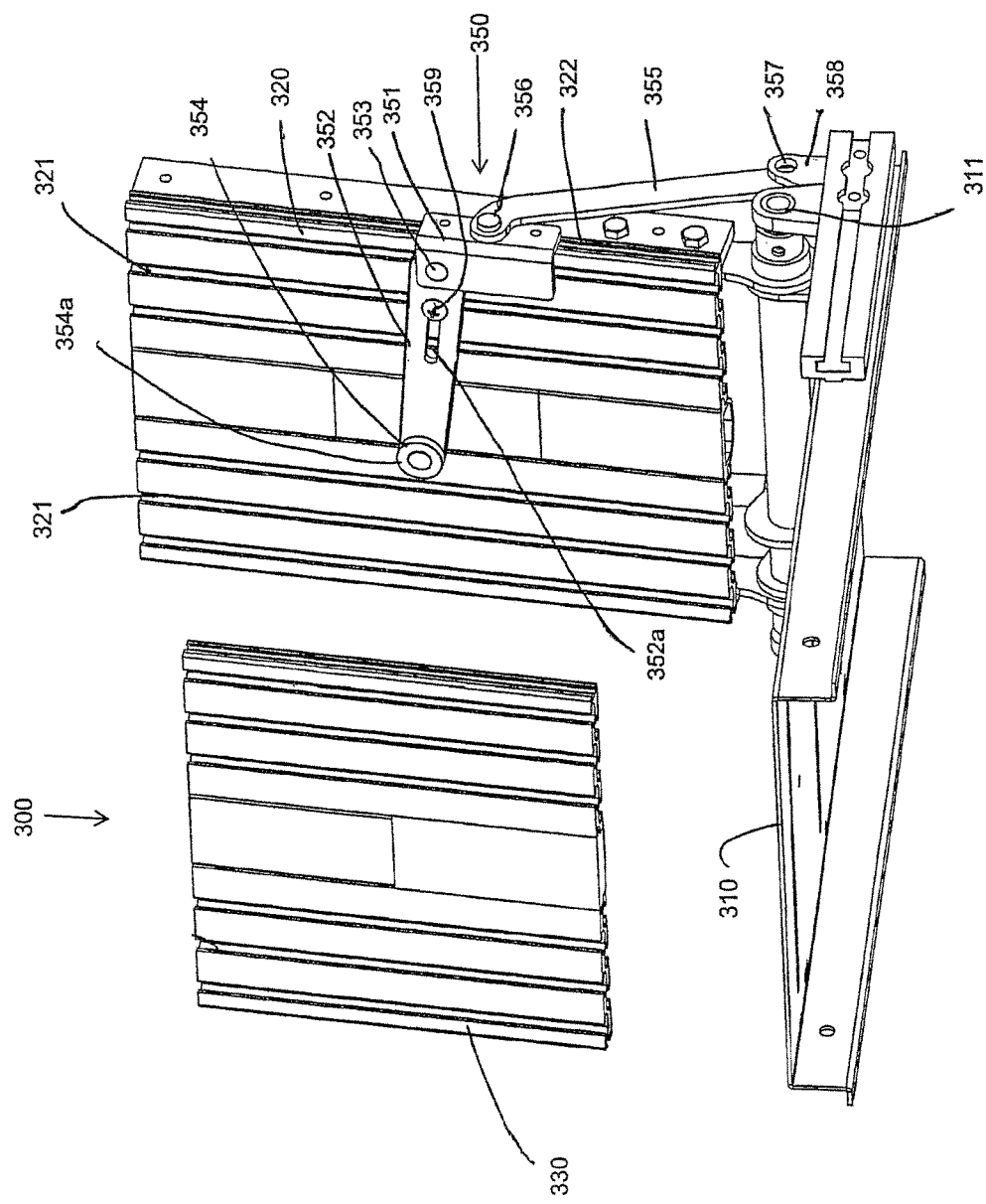
FIG. 10 is a front perspective view of the seat assembly of FIG. 9, shown with the back support detached from the back frame to illustrate additional features of the assembly.
Figure 11:
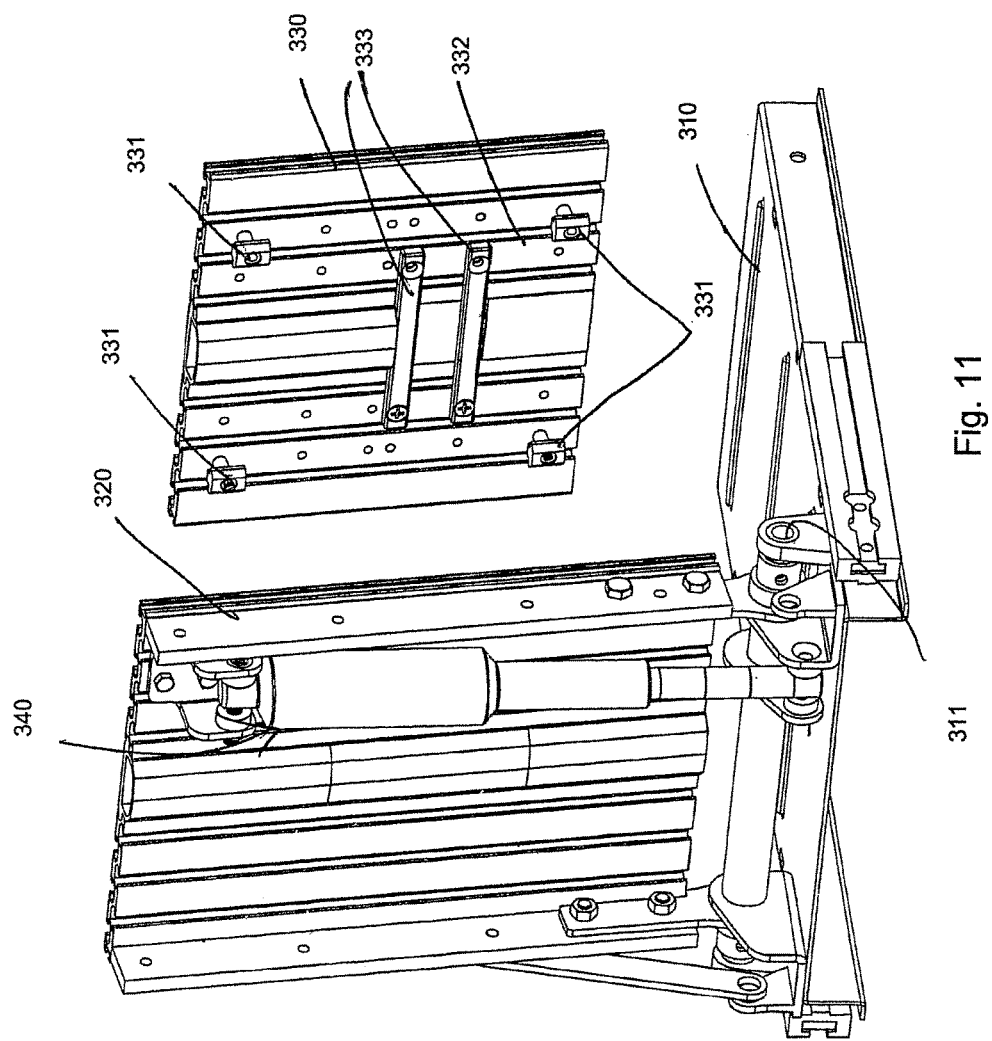
FIG. 11 is a rear perspective view of the seat assembly of FIG. 9.
Figure 12:
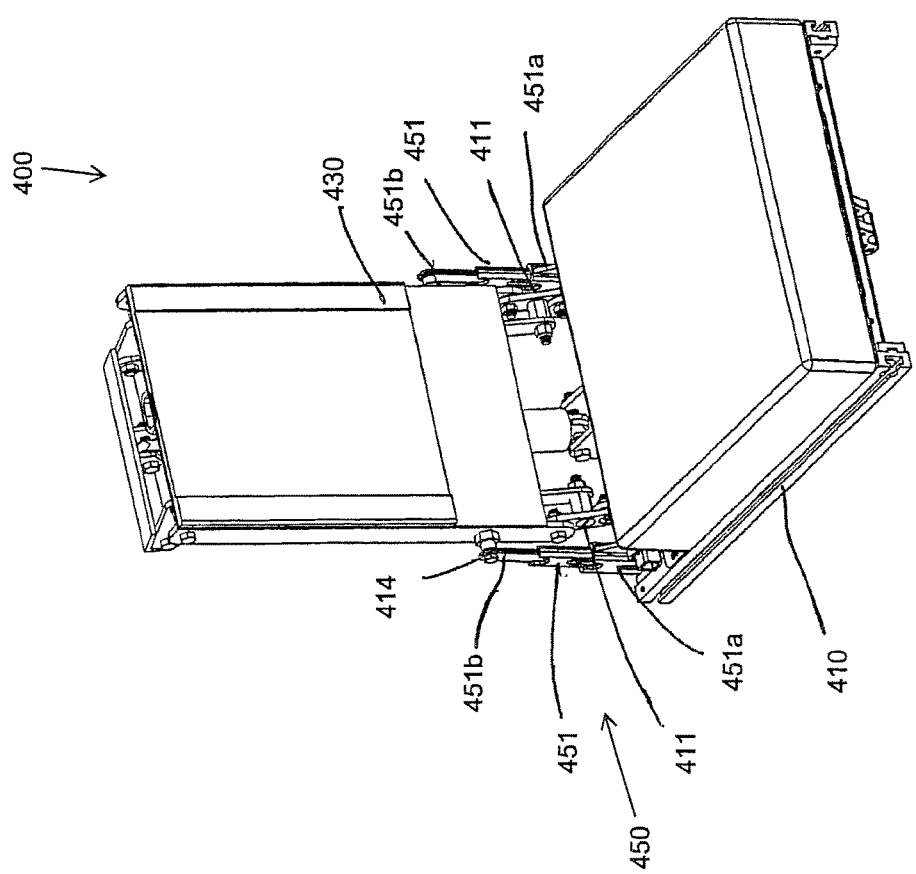
FIG. 12 is a front perspective view of a seat assembly in accordance with another exemplary embodiment.
Figure 13:
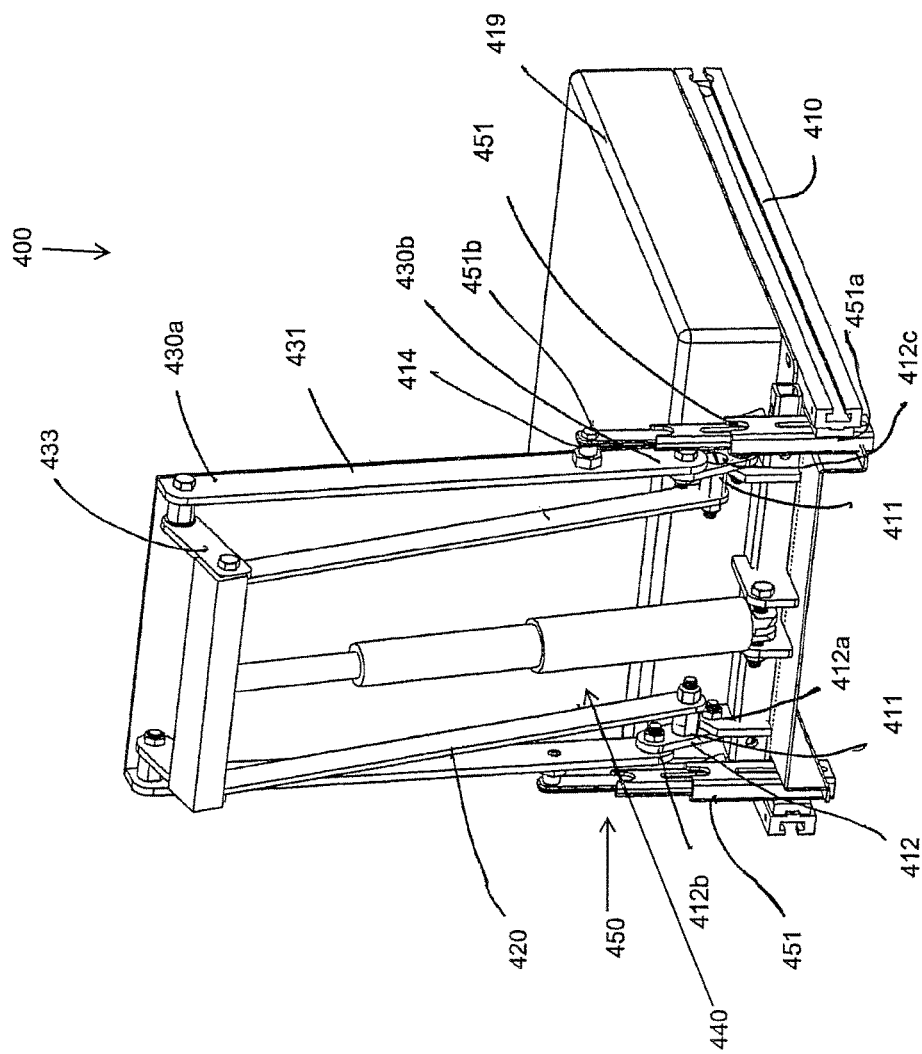
FIG. 13 is a rear perspective view of the seat assembly of FIG. 12.
Figure 15:
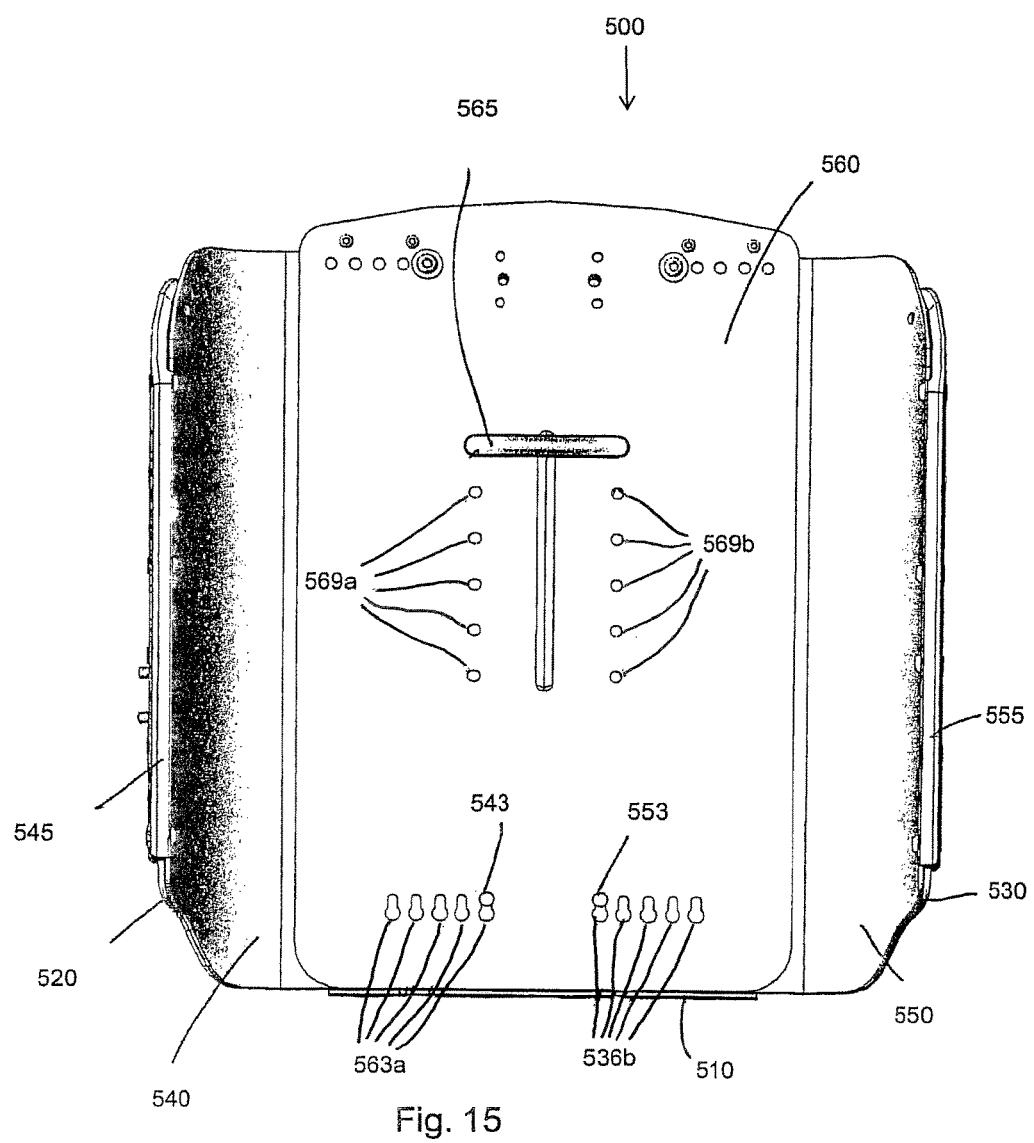
FIG. 15 is a front view of an adjustable back support.
Figure 16:
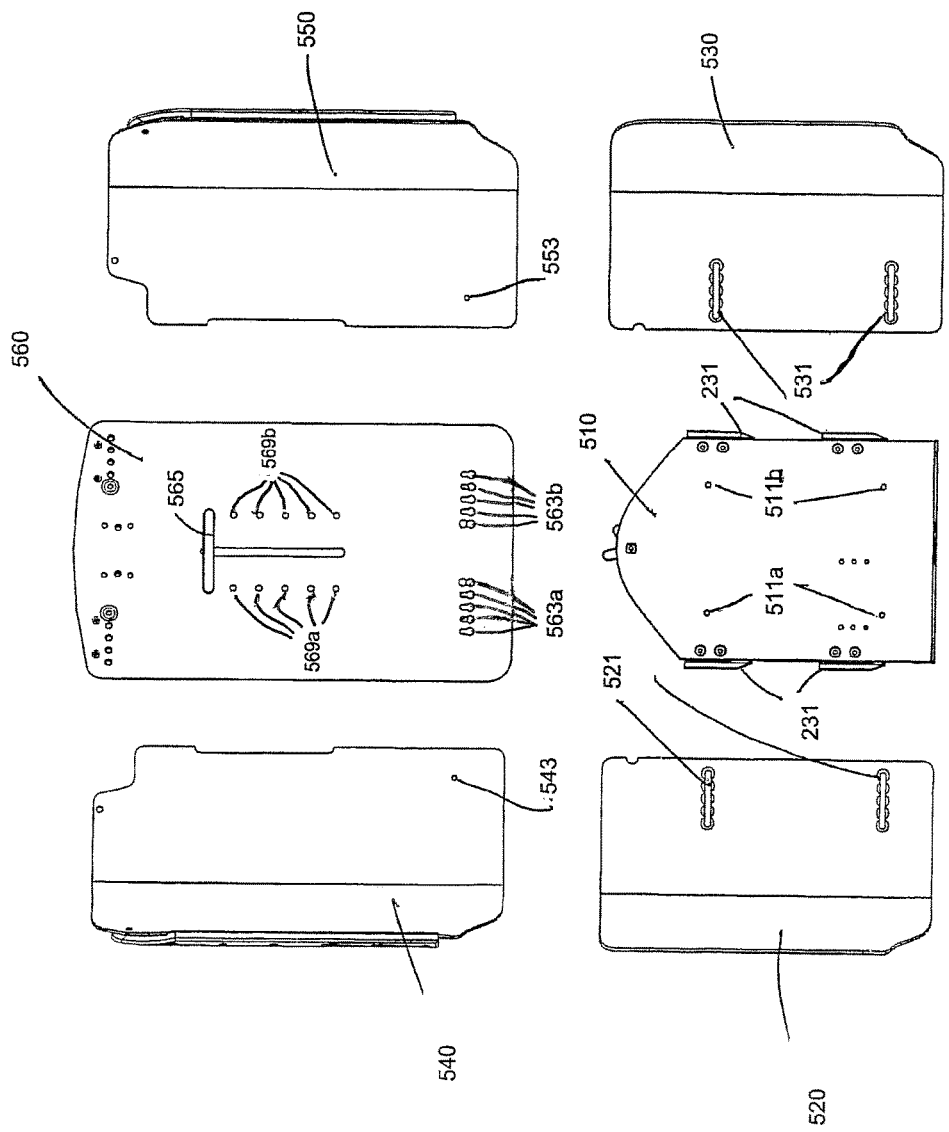
FIG. 16 is an exploded front view of the back support of FIG. 15.
Figure 17:
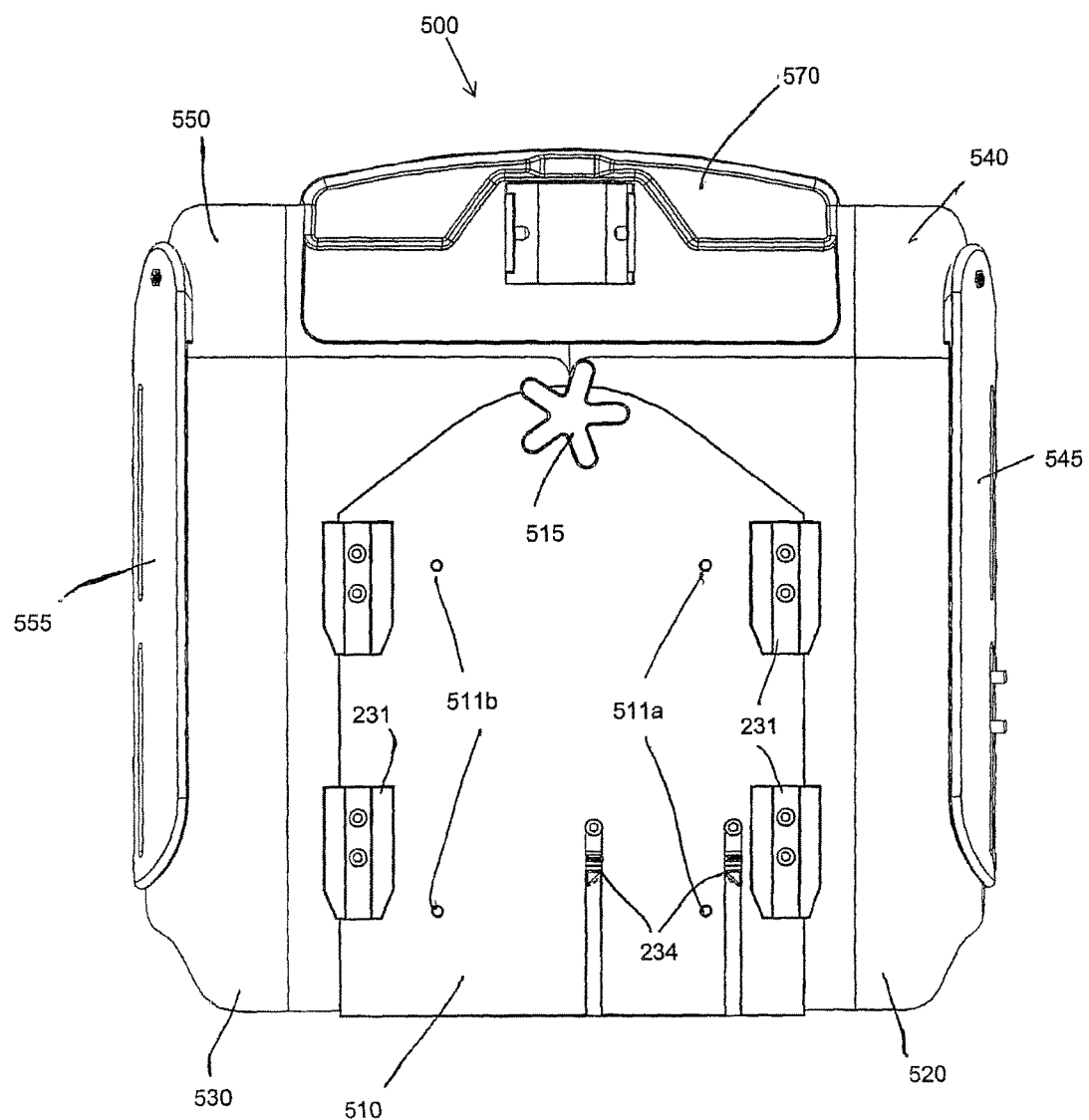
FIG. 17 is a rear view of the back support of FIG. 15.
Figure 18:
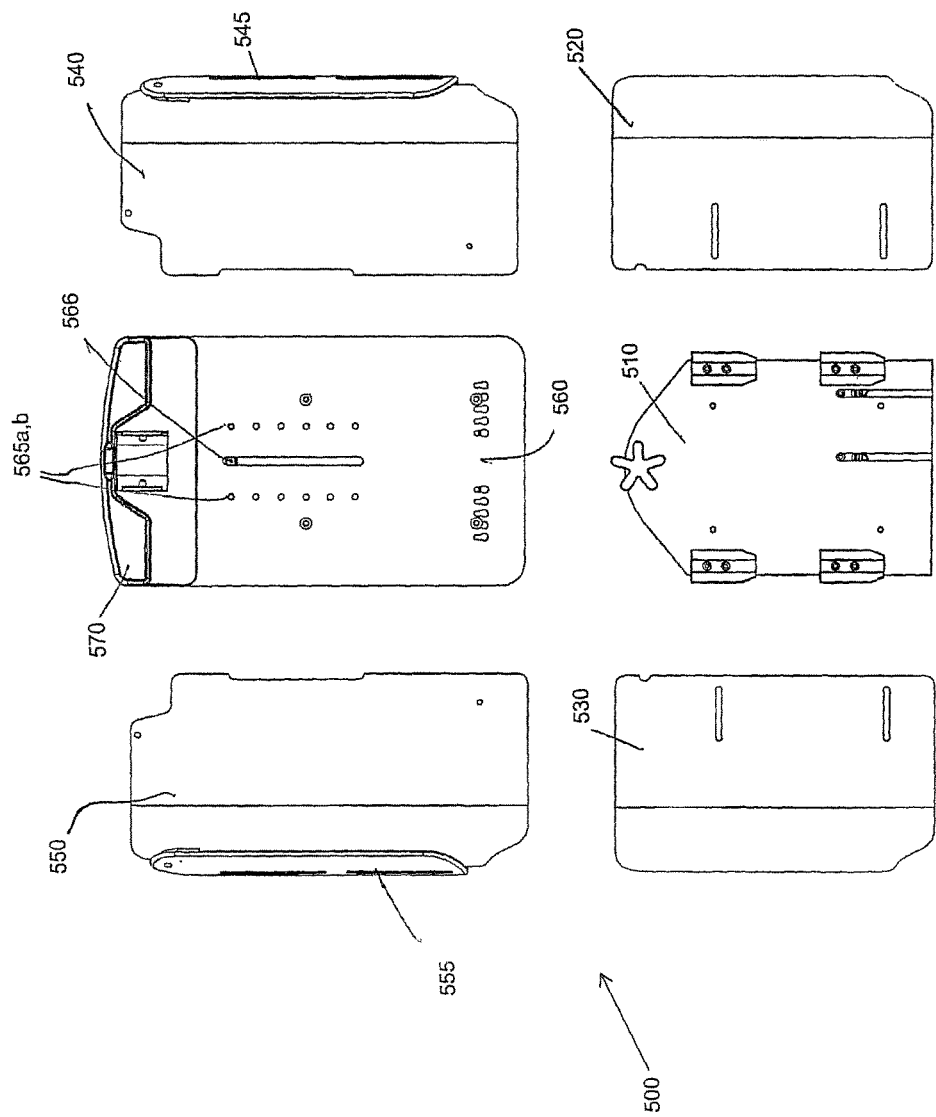
FIG. 18 is an exploded rear view of the back support of FIG. 15.

FIGS. 9-11 illustrate an exemplary embodiment of a wheelchair seat assembly 300 including a seat frame 310, a back frame 320 pivotally connected to the seat frame (at pivot joint 311), a back support 330 slideably assembled with the seat frame, and a back support adjusting mechanism 350 for controlling the position of the back support on the back frame as the back frame is pivoted with respect to the seat frame. While many different mechanical or electromechanical mechanisms may be used to impart pivoting movement on the back frame 320, in the illustrated embodiment, an actuator assembly 340 (FIG. 11) is assembled with the seat frame 310 and back frame 320 to pivot the back frame with respect to the seat frame, for example, in response to manipulation of a switch, button or other such instrument on the wheelchair (not shown).

The exemplary back support 330 includes flanged slider pins 331 secured to a rear surface 332 of the back support 330. The slider pins 331 are slideably received in recessed tracks 321 in a front surface of the back frame 320, to guide sliding movement of the back support 330 along the back frame 320.

The linkage assembly 350 includes a first slide member or slide plate 351 slideably secured in a side track 322 of the back frame 320. The slide plate 351 is pivotally connected to a first end 353 of a pivot bar 352 disposed between the back frame 320 and the back support 330. A second end 354 of the pivot bar 352 includes a second slide member or enlarged hub 354a that rides between guide bars 333 secured to the rear surface 332 of the back support 330, providing an operative connection between the slide plate 351 and the back support 330. The pivot bar 352 is further guided on the back frame 320 by a fastener 359 extending through a slot 352a in the pivot bar 352 and received in a track 321 in the back frame 320. The fastener 359 provides a pivot point for the pivot bar 352 on the back frame 320. The slide plate 351 is pivotally connected to a first end 356 of a first linking member 355. The second end 357 of the linking member 355 is pivotally connected to the seat frame 310 by plate 358.

To move the seat assembly 300 to a reclined position, the actuator assembly 340 is actuated to pull the back frame 320 rearward, pivoting the back frame 320 about the pivot joint 311 in a reclining direction. The first linking member 355 pivots rearward about the first end 357, causing the second end 356 to slide the slide plate 351 upward. As a result, the pivot bar or second linking member 352 pivots about the fastener 359 counterclockwise (as viewed from the front), resulting in downward movement of the hub portion 354a of the pivot bar 352, causing the back support 330 to slide downward or toward a position proximate to the pivot joints 311, to approximate the shifting position of the chair occupant's back with respect to a back plane defined by the back frame.

To move the seat assembly 300 to an upright position, the actuator assembly 340 is actuated to push the back frame 320 forward, pivoting the back frame 320 about the pivot joint 311 in an inclining direction. The linking member 355 pivots forward about the first end 357, causing the second end 356 to slide the slide plate 351 downward. As a result, the pivot bar 352 pivots about the fastener 359 clockwise (as viewed from the front), resulting in upward movement of the hub portion 354a of the pivot bar 352, causing the back support 330 to slide upward or toward a position distal to the pivot joints 311, to approximate the shifting position of the chair occupant's back with respect to the back plane.

According to another aspect of the present application, a pivotal connection between a back support and a seat frame may be configured to automatically adjust with respect to one of the back support and the seat frame as a back frame is pivoted about a pivot joint between the back frame and the seat frame. As the back frame is pivoted from an upright position to a reclined position, the back support slides toward the seat frame to approximate movement of the chair occupant's back with respect to the pivot joint as the occupied seat is reclined.

FIGS. 12-14E illustrate an exemplary embodiment of a wheelchair seat assembly 400 including a seat frame 410, a back frame 420 pivotally connected to the seat frame (at pivot joints 411), a back support 430 pivotally connected with the seat frame, and a linkage arrangement 450 for controlling the position of the back support with respect to the back frame as the back frame is pivoted with respect to the seat frame. While many different mechanical or electro-mechanical mechanisms may be used to impart pivoting movement on the back frame 420, in the illustrated embodiment, an actuator assembly 440 is assembled with the seat frame 410 and back frame 420 to pivot the back frame with respect to the seat frame, for example, in response to manipulation of a switch, button or other such instrument on the wheelchair (not shown).

The exemplary back support 430 has an upper end 430a pivotally connected to an upper end 421 of the back frame 420 by a link member 433. The pivot joints 411 each include a link bar 412 having a first end 412a pivotally connected to the seat frame 410, a second end 412b pivotally connected to a lower end 430b of the back support 430, and an intermediate portion 412c pivotally connected to a lower end of the back frame 420. The linkage arrangement 450 includes left and right slide assemblies 451 each having a first end 451a rigidly affixed to the seat frame 410 and a second end 451b pivotally connected to the back support 430 at pivot points 414.

As shown in FIGS. 14A-14E, to move the seat assembly 400 to a reclined position, the actuator assembly 440 is actuated to pull the back frame 420 rearward, pivoting the link bar 412 forward about the first end 412a, and pivoting the upper end 430a of the back support 430 rearward about pivot points 414. The pivoting movement of the back support 430 causes the second ends 451b of the slide assemblies to slide downward, thereby moving the pivot points 414 of the back support 430 closer to the seat frame and sliding the lower end 430b of the back support 430 toward alignment with a rear portion of the seat surface (defined by seat cushion 419 secured to the seat frame 410), to approximate the shifting position of the chair occupant's back with respect to a back plane defined by the back support. As shown in FIG. 14E, the fully reclined back support may be substantially flat or nearly flat (e.g., approximately 175 degrees), with the seat support surface and a back support surface (defined by a back cushion, not shown, secured to the back support 430) being substantially or nearly aligned, for example, to maximize comfort of a fully reclined or prone occupant.

To move the seat assembly 400 to an upright position, the actuator assembly 440 is actuated to push the back frame 420 forward, pivoting the link bar 412 rearward about the first end 412a, and pivoting the upper end 430a of the back support 430 forward about pivot points 414. The pivoting movement of the back support 430 causes the second ends 451b of the slide assemblies to slide upward, thereby moving the pivot points 414 of the back support 430 further from the seat frame and sliding the lower end 430b of the back support 430 away from the seat surface, to approximate the shifting position of the chair occupant's back with respect to a back plane defined by the back support.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, where components are releasably or removably connected or attached together, any type of releasable connection may be suitable including for example, locking connections, fastened connections, tongue and groove connections, etc. Still further, component geometries, shapes, and dimensions can be modified without changing the overall role or function of the components. Therefore, the inventive concept, in its broader aspects, is not limited to the specific details, the representative apparatus, and illustrative examples shown and described.

Accordingly, departures may be made from such details without departing from the spirit or scope of the applicant's general inventive concept.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

We claim:

1. A seat assembly comprising:
   a seat frame defining a seating area;
   a back frame pivotally connected to the seat frame at a pivot joint and pivotable about a pivot axis defined by the pivot joint between an upright position and a reclined position, the back frame having a width extending in the direction of the pivot axis and a length extending radially from the pivot axis;
   a back support slideably secured to the back frame; and
   a back support adjusting mechanism, comprising:
      a first linking member coupling the back support to the seat frame and pivotable about the pivot axis when the back frame is pivoted between the upright and reclined positions;
      a first slide member slideably supported by the back frame and operatively connected to the first linking member, such that pivoting movement of the back frame from the upright position to the reclined position slides the first slide member away from the pivot axis, and pivoting movement of the back frame from the reclined position to the upright position slides the first slide member towards the pivot axis;
      a second slide member affixed to the back support and slideably supported by the back frame; and
      a second linking member operatively connecting the first slide member to the second slide member, such that sliding movement of the first slide member away from the pivot axis causes the second linking member to slide the second slide member and the back support toward the pivot axis, and sliding movement of the first slide member towards the pivot axis causes the second linking member to slide the second slide member and the back support away from the pivot axis.

2. The seat assembly of claim 1, wherein the second linking member comprises a belt extending around the back frame, with the first slide member being affixed to a first portion of the belt disposed on a rear surface of the back frame, and the second slide member being affixed to a second portion of the belt disposed on a front surface of the back frame.

3. The seat assembly of claim 2, wherein the first linking member comprises a linking bar having a first end pivotally connected to the seat frame and a second end pivotally connected to the first slide member.

4. The seat assembly of claim 2, wherein the belt comprises a cable.

5. The seat assembly of claim 2, wherein the back support is affixed to the first portion of the belt by a bracket secured to the belt, the bracket being attachable to a rear surface of the back support.

6. The seat assembly of claim 5, wherein the bracket is attached to the rear surface of the back support by at least one fastener, the at least one fastener being retractable to release the back support from the bracket.

7. The seat assembly of claim 6, wherein the bracket comprises a user operable release tab configured to retract the at least one fastener.

8. The seat assembly of claim 2, wherein the belt extends around first and second pulleys disposed on inner and outer edges of the back frame to facilitate sliding movement of the belt.

9. The seat assembly of claim 1, wherein the second linking member comprises a pivot bar having a first end pivotally connected to the first slide member and a second end pivotally connected to the second slide member.

10. The seat assembly of claim 9, wherein the pivot bar is guided on the back frame by a fastener extending through a slot in the pivot bar and received in a track in the back frame.

11. The seat assembly of claim 9, wherein the first slide member is slideably retained on a side edge of the back frame.

12. The seat assembly of claim 1, wherein the back support comprises a plurality of flanged members extending from a rear surface of the back support and received in corresponding recessed tracks in a front surface of the back frame extending along the length of the back frame.

13. The seat assembly of claim 1, further comprising at least one armrest assembled with the seat frame and configured such that movement of the back frame from the upright position to the reclined position causes the armrest to pivot to maintain an arm support member of the armrest in a substantially horizontal position with respect to the seat frame.

14. The seat assembly of claim 13, further comprising first and second links, the first link being pivotally connected to the seat frame at a first end and pivotally connected to a first end of the second link member at a second end, and the second link member being slideably assembled with a side rail portion of the back frame with a second end connected to the armrest.

15. The seat assembly of claim 1, wherein the back support comprises an anchor plate attachable to the second slide member, and at least one adjustable plate securable to the anchor plate in a plurality of positions to adjust the size of a back supporting surface defined by the back support.

16. The seat assembly of claim 15, wherein the at least one adjustable plate comprises a vertically adjustable spanner plate securable directly to the anchor plate, and first and second laterally adjustable wing plates securable directly to first and second lateral sides of the spanner plate.

17. The seat assembly of claim 16, wherein the spanner plate is secured to the anchor plate by a fastener secured through an aperture in the anchor plate and attached to a laterally extending bar selectively engageable with the spanner plate in a plurality of discrete vertical positions.

18. The seat assembly of claim 1, further comprising a motor-driven piston rod assembly assembled with the seat frame and the back frame and operable to pivot the back frame with respect to the seat frame.

19. A seat assembly comprising:
a seat frame defining a seating area;
a back frame pivotally connected to the seat frame at a pivot joint and pivotable about the pivot joint between a first position and a second position;
a back support pivotally connected to the back frame; and
at least one slide assembly having a first end affixed to the seat frame and a second end pivotably connected to the back support at a pivot point, the back support being pivotable between upright and reclined positions when the back frame is pivoted between the first and second positions;
wherein movement of the back frame from the first position to the second position causes the second end of the slide assembly to slide toward the first end of the slide assembly, causing the pivot point to move toward the seat frame as the back support pivots from the upright position to the reclined position.

20. A back support comprising:
an anchor plate attachable to a back frame of a wheelchair;
a spanner plate securable to the anchor plate in a range of vertical positions to adjust a height of the back support; and
first and second wing plates securable to first and second lateral sides of the spanner plate in a range of lateral positions to adjust a width of the back support;
wherein the spanner plate is secured to the anchor plate by a fastener secured through an aperture in the anchor plate and attached to a laterally extending bar selectively engageable with the spanner plate in a plurality of discrete vertical positions.

21. The back support of claim 20, further comprising third and fourth wing plates securable directly to the anchor plate in a range of lateral positions to adjust a second width of the back support.

22. The back support of claim 20, further comprising a headrest plate attachable to a headrest and securable to the spanner plate in a range of vertical positions to adjust a height of the headrest on the back support.

\* \* \* \* \*